United States Patent
Kozasa

(10) Patent No.: US 11,117,441 B2
(45) Date of Patent: Sep. 14, 2021

(54) AIR CONDITIONER FOR VEHICLE

(71) Applicant: DENSO CORPORATION, Kariya (JP)

(72) Inventor: Tetsuo Kozasa, Kariya (JP)

(73) Assignee: DENSO CORPORATION, Kariya (JP)

( * ) Notice: Subject to any disclaimer, the term of this patent is extended or adjusted under 35 U.S.C. 154(b) by 319 days.

(21) Appl. No.: 16/396,817

(22) Filed: Apr. 29, 2019

(65) Prior Publication Data

US 2019/0255907 A1    Aug. 22, 2019

Related U.S. Application Data

(63) Continuation of application No. PCT/JP2017/038655, filed on Oct. 26, 2017.

(30) Foreign Application Priority Data

Nov. 16, 2016    (JP) .............................. JP2016-223104

(51) Int. Cl.
| | | |
|---|---|---|
| *B60H 1/00* | (2006.01) | |
| *B60H 1/32* | (2006.01) | |
| *F25B 39/04* | (2006.01) | |
| *F25B 41/00* | (2021.01) | |
| *F25B 1/00* | (2006.01) | |
| *F16K 31/363* | (2006.01) | |

(Continued)

(52) U.S. Cl.
CPC ........... *B60H 1/00485* (2013.01); *B60H 1/00* (2013.01); *B60H 1/32* (2013.01); *B60H 1/3207* (2013.01);

(Continued)

(58) Field of Classification Search
CPC ........ B60H 1/00485; B60H 1/00; B60H 1/32; B60H 1/3207; B60H 1/3227; B60H 1/00335; B60H 2001/3255; B60H 2001/3251; B60H 2001/3279; F25B 39/04; F25B 41/00; F25B 41/20; F25B 1/00; F25B 40/00; F25B 2339/0444; F16K 31/363; F28F 27/02; F28F 9/0246; F28F 9/0202; F28D 1/0443; F28D 1/05375; F28D 2021/0084
See application file for complete search history.

(56) References Cited

U.S. PATENT DOCUMENTS

| | | | |
|---|---|---|---|
| 5,669,231 A | 9/1997 | Itoh et al. | |
| 5,709,106 A * | 1/1998 | Inaba ................... | B60H 1/3227 62/507 |

(Continued)

FOREIGN PATENT DOCUMENTS

| | | |
|---|---|---|
| DE | 102012222620 A1 | 6/2014 |
| GB | 2272506 A | 5/1994 |

(Continued)

*Primary Examiner* — Emmanuel E Duke
(74) *Attorney, Agent, or Firm* — Harness, Dickey & Pierce, P.L.C.

(57) ABSTRACT

An air conditioner for a vehicle includes: a condenser that includes a core for allowing heat exchange between a refrigerant discharged from a compressor of a refrigeration cycle and air; and a switching unit that switches a refrigerant passage in the condenser. The switching unit switches the refrigerant passage between a first refrigerant passage that allows the refrigerant to flow throughout the core, and a second refrigerant passage that allows the refrigerant to flow through a part of the core by allowing the refrigerant discharged from the compressor to flow into a middle part of the core.

8 Claims, 20 Drawing Sheets

(51) Int. Cl.
    *F28F 27/02*     (2006.01)
    *F25B 40/00*     (2006.01)
    *F25B 41/20*     (2021.01)

(52) U.S. Cl.
    CPC ......... *B60H 1/3227* (2013.01); *F16K 31/363* (2013.01); *F25B 1/00* (2013.01); *F25B 39/04* (2013.01); *F25B 40/00* (2013.01); *F25B 41/00* (2013.01); *F28F 27/02* (2013.01); *F25B 41/20* (2021.01)

(56) References Cited

U.S. PATENT DOCUMENTS

| | | | |
|---|---|---|---|
| 6,209,349 B1 * | 4/2001 | Hu | B60H 1/3229 |
| | | | 165/110 |
| 2007/0074538 A1 | 4/2007 | Kurata et al. | |
| 2009/0241573 A1 | 10/2009 | Ikegami et al. | |
| 2015/0075204 A1 * | 3/2015 | Brodie | B60H 1/00335 |
| | | | 62/324.6 |

FOREIGN PATENT DOCUMENTS

| | | |
|---|---|---|
| JP | H07127948 A | 5/1995 |
| JP | H08020227 A | 1/1996 |
| JP | H09066736 A | 3/1997 |
| JP | 2004255946 A | 9/2004 |
| JP | 2004268792 A | 9/2004 |
| JP | 2006097978 A | 4/2006 |
| JP | 2007071461 A | 3/2007 |
| JP | 2009236404 A | 10/2009 |

\* cited by examiner

AIR CONDITIONER FOR VEHICLE

CROSS REFERENCE TO RELATED APPLICATIONS

The present application is a continuation application of International Patent Application No. PCT/JP2017/038655 filed on Oct. 26, 2017, which designated the United States and claims the benefit of priority from Japanese Patent Application No. 2016-223104 filed on Nov. 16, 2016. The entire disclosures of all of the above applications are incorporated herein by reference.

TECHNICAL FIELD

The present disclosure relates to an air conditioner for a vehicle.

BACKGROUND ART

Recently, in the automobile market in Japan, China, and the like, a vehicle air conditioner has been more often used in an inside air mode at a low outside air temperature such as in winter due to outside air pollution and the like. As a result, moisture is trapped in a passenger compartment to raise humidity so that a window is easily fogged. The inside air mode refers to a mode in which air in the passenger compartment (hereinafter referred to as inside air) is circulated in the passenger compartment without introducing air outside the passenger compartment (hereinafter referred to as outside air) into the passenger compartment.

SUMMARY

According to an aspect of the present disclosure, an air conditioner for a vehicle includes: a condenser that includes a core for allowing heat exchange between a refrigerant discharged from a compressor of a refrigeration cycle and air; and a switching unit that switches a refrigerant passage in the condenser. The switching unit switches the refrigerant passage between a first refrigerant passage that allows the refrigerant to flow throughout the core, and a second refrigerant passage that allows the refrigerant to flow through a part of the core by allowing the refrigerant discharged from the compressor to flow into a middle part of the core.

DESCRIPTION OF EMBODIMENTS

Figure 1:
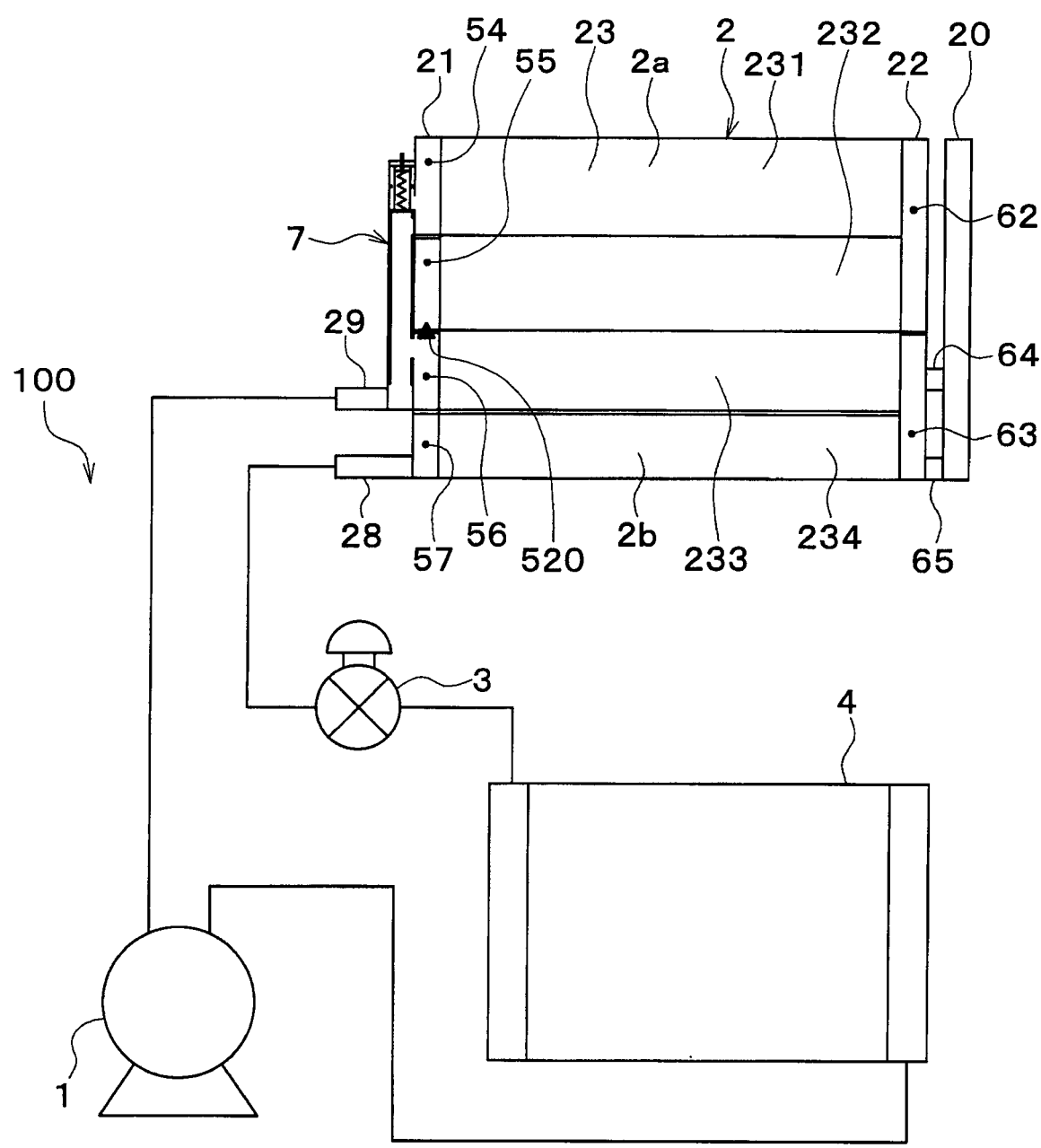
FIG. 1 is a diagram illustrating a refrigeration cycle of a vehicle air conditioner according to a first embodiment.

To begin with, examples of relevant techniques will be described.

In a typical vehicle air conditioner, the temperature of the outside air supplied to a condenser decreases at a low temperature during winter, so that high side pressure of a refrigerant flowing out of the condenser is decreased. Thus, a pressure difference between the high side pressure and low side pressure is reduced in the refrigeration cycle.

In particular, the condenser is disposed at a front end of a vehicle so that, when the vehicle travels at high speed, the draft hitting the condenser increases to cause an increase in the volume of outside air supplied to the condenser. As a result, the high side pressure of the refrigeration cycle tends to decrease more, and the pressure difference between the high side pressure and the low side pressure tends to be further reduced.

When the pressure difference between the high side pressure and the low side pressure is reduced in the refrigeration cycle, the condensing capacity of the condenser becomes too high so that the liquid phase refrigerant accumulates in most spaces of the condenser and that the flow of the refrigerant flowing out to the side of an evaporator is extremely reduced.

As for a compressor, the refrigerant discharge capacity decreases when the pressure difference between the high side pressure and the low side pressure is reduced in the refrigeration cycle, whereby the flow of the refrigerant is further reduced.

When an inlet mode is set to the inside air mode, the temperature of air introduced into the evaporator is as high as about 30° C., at which the evaporator is in a state of high heat load. The flow of the refrigerant flowing out to the evaporator is extremely reduced as well. As a result, the low side pressure of the refrigerant flowing into the evaporator tends to increase, and the pressure difference between the refrigerant pressure on an outlet side of the condenser and the refrigerant pressure on an inlet side of the evaporator is reduced. Thus, the flow of the refrigerant flowing out toward the evaporator is further reduced.

As a result, the cooling capacity (that is, the dehumidifying capacity) of the evaporator decreases, and absolute humidity of the air blown on the window increases. The window is thus easily fogged.

A vehicle air conditioner may be switched to the inside air mode only when the humidity in the passenger compartment is lower than a predetermined value (a fog determining parameter). In this comparison case, the vehicle air conditioner can prevent fogging of the window and at the same time secure longer time for inside air circulation than a system that switches to an outside air mode at regular time intervals.

However, the vehicle air conditioner in the comparison example is forcibly switched to the outside air mode when fogging of the window is likely to occur due to high humidity in the passenger compartment. Thus, even if an occupant desires air conditioning in the inside air mode, the inside air mode cannot be maintained in some cases.

In view of the above points, the present disclosure aims to secure anti-fog properties of a window even when a vehicle air conditioner is used in an inside air mode at a low outside air temperature.

According to an aspect of the present disclosure, an air conditioner for a vehicle includes: a condenser that includes a core for allowing heat exchange between a refrigerant discharged from a compressor of a refrigeration cycle and air; and a switching unit that switches a refrigerant passage in the condenser. The switching unit switches the refrigerant passage between a first refrigerant passage that allows the refrigerant to flow throughout the core, and a second refrigerant passage that allows the refrigerant to flow through a part of the core by allowing the refrigerant discharged from the compressor to flow into a middle part of the core.

Thus, when the outside air temperature drops, the switching unit switches the refrigerant passage in the condenser to the second passage to be able to reduce a heat exchange region (heat exchange area) in which heat exchange occurs between the refrigerant and a heat medium in the condenser. As a result, the high side pressure of the refrigeration cycle increases, and the flow of the refrigerant circulating through the refrigeration cycle increases so that the cooling capacity (that is, the dehumidifying capacity) of an evaporator can be improved. Therefore, the anti-fog properties of a window can be secured even when the vehicle air conditioner is used in the inside air mode at a low outside air temperature.

Hereinafter, embodiments will be described according to the drawings. Same or equivalent portions among respective embodiments below are labeled with same reference numerals in the drawings.

First Embodiment

A first embodiment will be described with reference to FIGS. 1 to 7. A condenser 2 of the present embodiment is applied to a refrigeration cycle 100 illustrated in a diagram of the overall configuration in FIG. 1. The refrigeration cycle 100 serves the function of cooling indoor air blown into the interior in an air conditioner that performs indoor air conditioning.

Specifically, the refrigeration cycle 100 is a vapor-compression refrigeration cycle formed by connecting in a loop a compressor 1 that compresses and discharges a refrigerant, the condenser 2 that allows heat exchange between a high pressure refrigerant discharged from the compressor 1 and outside air to condense the high pressure refrigerant, an expansion valve 3 that decompresses and expands the high pressure refrigerant flowing out of the condenser 2, and an evaporator 4 that allows heat exchange between a low pressure refrigerant decompressed and expanded by the expansion valve 3 and indoor blown air to evaporate the low pressure refrigerant.

The refrigeration cycle 100 of the present embodiment adopts an HFC refrigerant (specifically, R134a) as the refrigerant, and forms a subcritical refrigeration cycle in which a refrigerant pressure on the high pressure side does not exceed a critical pressure of the refrigerant. Of course, the refrigeration cycle may adopt an HFO refrigerant (for example, R1234yf) or the like as the refrigerant. Refrigerant oil for lubricating the compressor 1 is also mixed in the refrigerant, and some of the refrigerant oil is circulated in the cycle along with the refrigerant.

Next, the detailed configuration of the condenser 2 of the present embodiment will be described. The condenser 2 according to the present embodiment has a function of storing a liquid phase refrigerant to retain the refrigerant in the refrigeration cycle.

Figure 2:
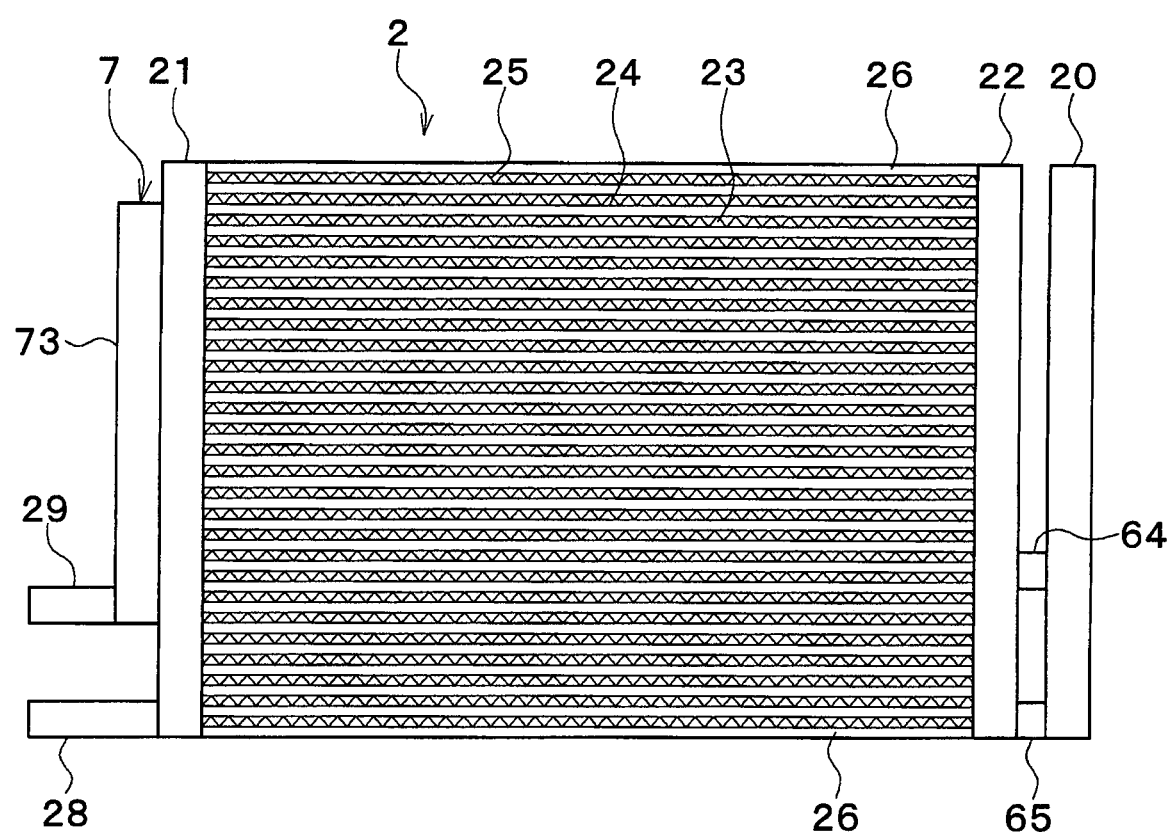
FIG. 2 is a front view illustrating a condenser of the first embodiment.
Figure 3:
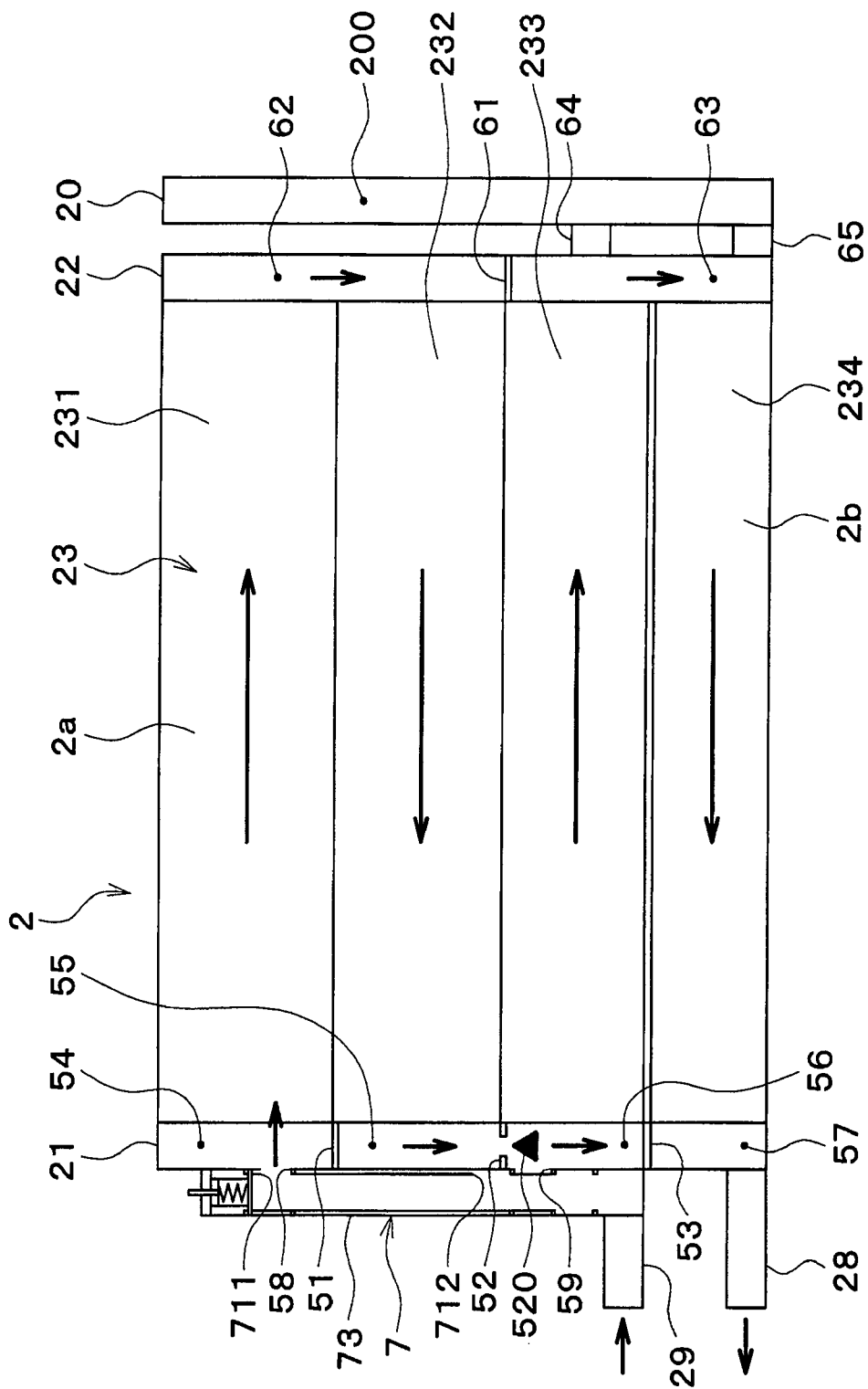
FIG. 3 is an explanatory diagram illustrating the flow of a refrigerant in the condenser during normal operation, according to the first embodiment.

As illustrated in FIGS. 2 and 3, the condenser 2 of the present embodiment is a refrigerant condenser with which a modulator tank is integrated. The condenser 2 includes a condensing portion 2a, a subcooling portion 2b, and a modulator tank 20, which are formed integrally.

The condensing portion 2a is a heat exchange portion that condenses a gas phase refrigerant by allowing heat exchange between the refrigerant discharged from the compressor 1 and air (external fluid). The modulator tank 20 is a gas-liquid separating unit that separates the refrigerant entering from the condensing portion 2a into a gas phase refrigerant and a liquid phase refrigerant to store surplus refrigerant in the refrigeration cycle 100 as the liquid phase refrigerant as well as allow outflow of the liquid phase refrigerant. The subcooling portion 2b is a heat exchange portion that cools the liquid phase refrigerant by allowing heat exchange between the liquid phase refrigerant entering from the modulator tank 20 and the air, thereby increasing the degree of subcooling of the refrigerant. The modulator tank 20 of the present embodiment is formed in a tubular shape extending in a vertical direction (that is, in the direction of gravity).

The condenser 2 includes a first header tank 21 and a second header tank 22 which are a pair of header tanks disposed at a predetermined interval and each having a cylindrical shape. A core 23 for heat exchange is disposed between the first header tank 21 and the second header tank 22. The core 23 includes the condensing portion 2a and the subcooling portion 2b. The condenser 2 is a heat exchanger of a so-called multi-flow type in which the refrigerant flowing into the first header tank 21 is split into a plurality of refrigerant passages to flow toward the second header tank 22.

As illustrated in FIG. 2, the core 23 includes many tubes 24 each having a flat shape in cross section and stacked to allow the refrigerant to flow in a horizontal direction between the first header tank 21 and the second header tank 22. An outer fin 25 having a wavy shape (corrugated shape) is provided between the tubes 24 adjacent to each other. The tubes 24 and the outer fin 25 are joined to each other by brazing.

One end of the tube 24 in the longitudinal direction is disposed to communicate with the inside of the first header tank 21, and the other end of the tube is disposed to communicate with the inside of the second header tank 22. Each tube 24 forming the core 23 is formed of a multi-hole tube having a plurality of small passages therein. Such a multi-hole tube can be formed by extrusion molding.

A side plate 26 for reinforcing the core 23 is provided at the lower end of the core 23. The side plate 26 extends in parallel with the longitudinal direction of the tubes 24, and both ends of the side plate are connected to the first header tank 21 and the second header tank 22.

An outlet pipe joint 28 (a refrigerant outflow portion) for the refrigerant is provided on the lower end side of the first header tank 21. The outlet pipe joint 28 is joined to the first header tank 21. The outlet pipe joint 28 is a connecting member for connecting an outlet pipe (not shown) that allows the refrigerant to flow out from an internal space (a fourth space 57 to be described) on the lower side of the first header tank 21.

As illustrated in FIG. 3, a first separator 51, a second separator 52, and a third separator 53 are disposed inside the first header tank 21 and separate the internal space thereof in the vertical direction. The three separators 51, 52, and 53 are spaced from one another. The three separators 51, 52, and 53 separate the inside of the first header tank 21 into four spaces in the vertical direction.

A separator 61 is disposed inside the second header tank 22 and separates the internal space thereof in the vertical direction. The separator 61 separates the inside of the second header tank 22 into two spaces in the vertical direction.

The core 23 includes four passage groups arranged in the vertical direction. Hereinafter, in the core 23, the passage group positioned at the top in the vertical direction is referred to as a first passage group 231, the passage group positioned second from the top in the vertical direction is referred to as a second passage group 232, the passage group positioned third from the top in the vertical direction is referred to as a third passage group 233, and the passage group positioned at the bottom in the vertical direction is referred to as a fourth passage group 234.

Of the four passage groups, the first passage group 231, the second passage group 232, and the third passage group 233 make up the condensing portion 2a, and the fourth passage group 234 makes up the subcooling portion 2b.

Hereinafter, in the first header tank 21, the internal space positioned at the top in the vertical direction is referred to as a first space 54, the internal space positioned second from the top in the vertical direction is referred to as a second space 55, the internal space positioned third from the top in the vertical direction is referred to as a third space 56, and the internal space positioned at the bottom in the vertical direction is referred to as the fourth space 57.

The first space 54, the second space 55, and the third space 56 communicate with the condensing portion 2a of the core 23, that is, the first to third passage groups 231 to 233. The fourth space 57 communicates with the subcooling portion 2b of the core 23, that is, the fourth passage group 234.

The second separator 52 is provided with a check valve 520. The check valve 520 allows the refrigerant to flow only from the side of the second space 55 to the side of the third space 56.

The first header tank 21 is provided with a first inlet 58 for allowing the refrigerant to flow into the first space 54, and a second inlet 59 for allowing the refrigerant to flow into the third space 56. That is, the first inlet 58 is formed on a wall of the first header tank 21, the wall corresponding to the area that forms the first space 54 and facing the core 23. The second inlet 59 is formed on a wall of the first header tank 21, the wall corresponding to the area that forms the third space 56 and facing the core 23.

Hereinafter, in the second header tank 22, the internal space positioned on the upper side in the vertical direction is referred to as a first space 62, and the internal space positioned on the lower side in the vertical direction is referred to as a second space 63.

The second space 63 of the second header tank 22 and an internal space 200 of the modulator tank 20 communicate with each other via a first communication passage 64 and a second communication passage 65. The first communication passage 64 allows the upper side of the second space 63 in the second header tank 22 in the vertical direction, that is, the space corresponding to the third passage group 233 of the core 23, to communicate with the internal space 200 of the modulator tank 20. The second communication passage 65 allows the lower side of the second space 63 in the second header tank 22 in the vertical direction, that is, the space corresponding to the fourth passage group 234 of the core 23, to communicate with the internal space 200 of the modulator tank 20.

The modulator tank 20 having the tubular shape for separating the refrigerant into gas and liquid and storing the liquid phase refrigerant is provided integrally with the outer side of the second header tank 22. The modulator tank 20 and the second header tank 22 are in a relationship in which the internal spaces of the modulator tank and the second header tank communicate with each other through the first communication passage 64 and the second communication passage 65. The condensing portion 2a, the subcooling portion 2b, and the modulator tank 20 are each molded by stamping, extrusion molding, or the like using an aluminum material or an aluminum alloy material, and are assembled by integral brazing such as furnace brazing.

Although not shown in the drawing, the modulator tank 20 accommodates a desiccant for absorbing moisture in the refrigeration cycle 100 and a filter for collecting foreign matter in the refrigeration cycle 100.

A differential pressure valve 7 including a mechanical mechanism is assembled to the condenser 2. In the present embodiment, the differential pressure valve 7 is provided integrally with the outer side of the first header tank 21 of the condenser 2. The differential pressure valve 7 is a switching valve that switches the inlets 58 and 59 of the refrigerant depending on a pressure difference between the pressure of the refrigerant on the high pressure side of the refrigeration cycle 100 (hereinafter referred to as a high side pressure Ph) and an atmospheric pressure Po. That is, the differential pressure valve 7 opens one of the first inlet 58 and the second inlet 59 and closes the other depending on the pressure difference between the pressure of the refrigerant on the high pressure side of the refrigeration cycle 100 and the atmospheric pressure.

Next, the detailed configuration of the differential pressure valve 7 of the present embodiment will be described.

Figure 4:
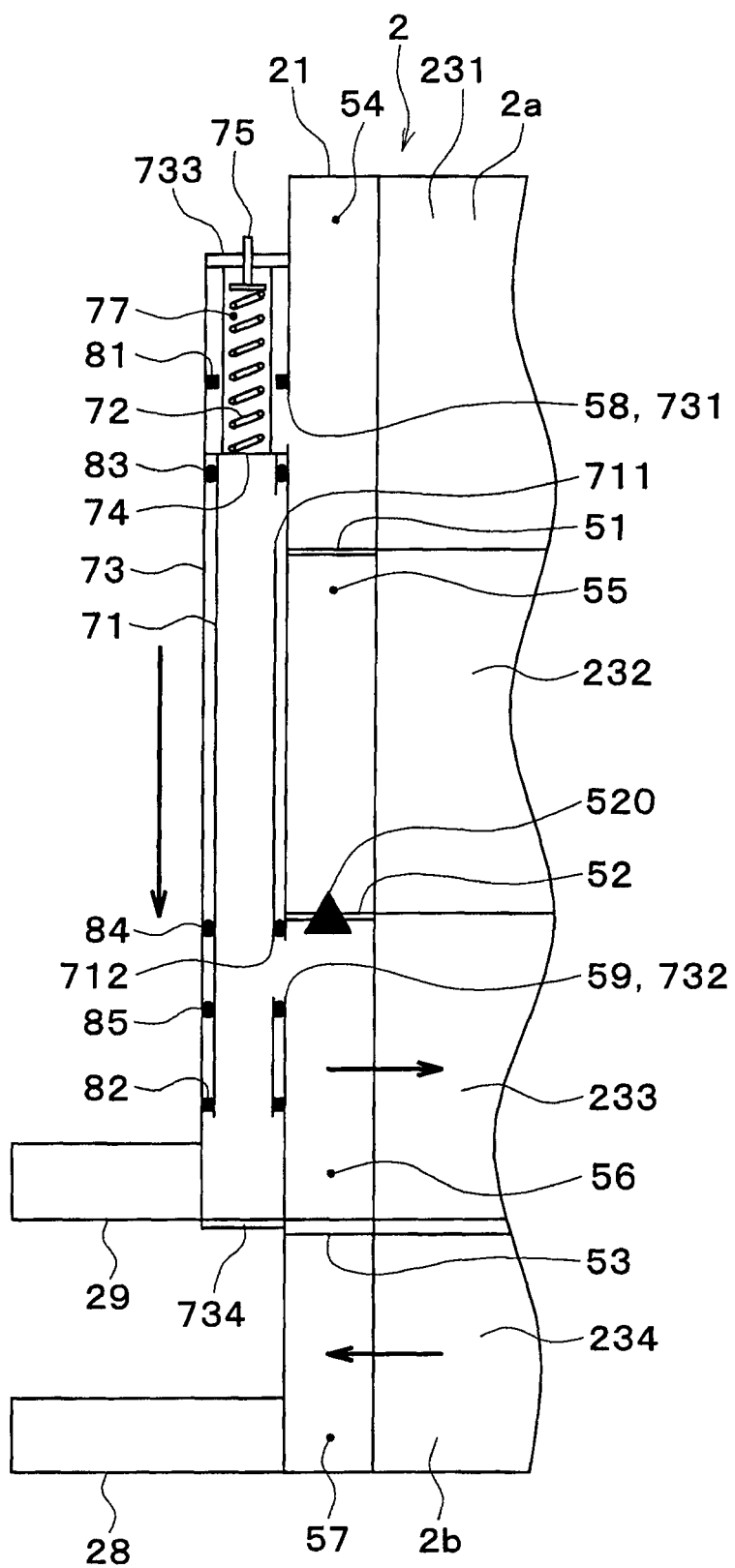
FIG. 4 is an enlarged view illustrating a differential pressure valve of the first embodiment.
Figure 5:
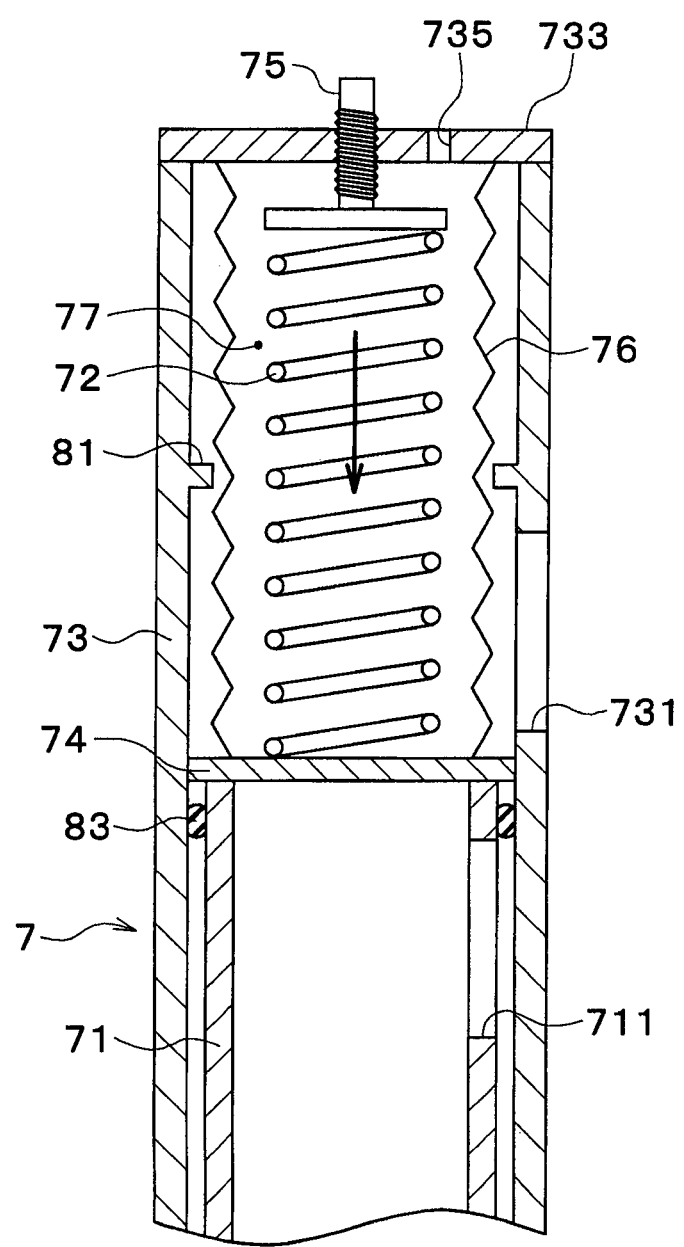
FIG. 5 is an enlarged sectional view illustrating the differential pressure valve of the first embodiment.

As illustrated in FIGS. 4 and 5, the differential pressure valve 7 includes a valve body 71 that opens and closes the first inlet 58 and the second inlet 59, and a coil spring 72 as an elastic member that applies a bias load to the valve body 71 in the direction of opening the second inlet 59. The differential pressure valve 7 also includes an outer cylinder 73 having a cylindrical shape to accommodate the valve body 71 and the coil spring 72 therein.

The outer cylinder 73 is formed in a cylindrical shape with both ends open. The outer cylinder 73 is disposed such that the axial direction thereof coincides with the vertical direction. An upper cover plate 733 that closes the open end (opening) of the outer cylinder 73 is joined to an upper surface of the outer cylinder 73. Similarly, a lower cover plate 734 that closes the open end (opening) of the outer cylinder 73 is joined to a lower surface of the outer cylinder 73. The upper cover plate 733 and the lower cover plate 734 are each formed in a disc shape.

The outer cylinder 73 is joined to the outside of the wall of the first header tank 21 facing the core 23. The outer cylinder 73 includes a first through hole 731 that can communicate with the first inlet 58 and a second through hole 732 that can communicate with the second inlet 59. As a result, the first space 54 in the first header tank 21 can communicate with the internal space in the outer cylinder 73 via the first inlet 58 and the first through hole 731. The third space 56 in the first header tank 21 can communicate with the internal space in the outer cylinder 73 via the second inlet 59 and the second through hole 732.

Figure 6:
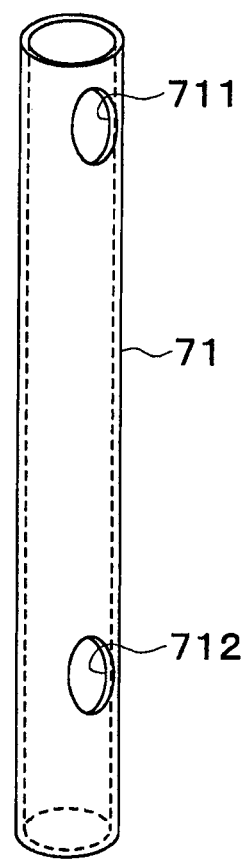
FIG. 6 is a perspective view illustrating a valve body of the differential pressure valve of the first embodiment.

As illustrated in FIG. 6, the valve body 71 is formed in a cylindrical shape extending in the vertical direction. Two through holes 711 and 712 are formed in the valve body 71. The two through holes 711 and 712 are aligned vertically while being spaced from each other. In the present embodiment, the two through holes 711 and 712 are each formed in an elliptical shape. Of the two through holes 711 and 712, the one disposed on the upper side is hereinafter referred to as a first through hole 711, and the one disposed on the lower side is hereinafter referred to as a second through hole 712.

As illustrated in FIG. 5, the upper surface of the valve body 71 is connected to the coil spring 72 via a spacer 74 having a disc shape. That is, one end of the coil spring 72 is connected to the valve body 71 via the spacer 74. The other end of the coil spring 72 is connected to the upper cover plate 733 of the outer cylinder 73 with a screw via a switching pressure adjusting screw 75. The switching pressure adjusting screw 75 is a screw for adjusting the operating pressure (switching pressure) of the differential pressure valve 7.

A bellows 76 is provided above the spacer 74 in the outer cylinder 73. The coil spring 72 and the switching pressure adjusting screw 75 are disposed inside the bellows 76. An upper end of the bellows 76 is joined to an inner wall of the upper cover plate 733 of the outer cylinder 73. A lower end of the bellows 76 is joined to the spacer 74.

A through hole 735 for allowing outside air to flow into the outer cylinder 73 is formed through the upper cover plate 733 of the outer cylinder 73. Thus, within the internal space of the outer cylinder 73, the space above the spacer 74, that is, the space surrounded by the upper cover plate 733 of the outer cylinder 73, the spacer 74, and the inner wall of the bellows 76, is an atmospheric pressure space 77 into which the outside air flows through the through hole 735.

As illustrated in FIGS. 4 and 5, an upper stopper 81 for restricting an upward movement of the valve body 71 and a lower stopper 82 for restricting a downward movement of the valve body 71 are provided inside the outer cylinder 73. In the present embodiment, the stoppers 81 and 82 are formed of protrusions that protrude radially inward from the inner wall of the outer cylinder 73. The upper stopper 81 is disposed above both the first through hole 731 and the spacer 74. The lower stopper 82 is disposed below the second through hole 732.

Three O-rings 83, 84, and 85 as seal members are provided in the gap between the outer cylinder 73 and the valve body 71. The three O-rings 83, 84, and 85 are spaced from one another.

As illustrated in FIG. 4, an inlet pipe joint 29 for the refrigerant is provided at the lower end of the outer cylinder 73. The inlet pipe joint 29 is a connecting member for connecting an inlet pipe (not shown) that allows the refrigerant to flow into the outer cylinder 73, and is joined to the outer wall of the outer cylinder 73.

Next, the operation of the differential pressure valve 7 of the present embodiment will be described.

The valve body 71 slides in the vertical direction inside the outer cylinder 73 depending on the difference between the high side pressure Ph and the atmospheric pressure Po. More specifically, the valve body 71 slides in the vertical direction depending on a balance between a value (Po×Ab+ Fs) obtained by adding a set load Fs, which corresponds to the pressing force of the coil spring 72 on the valve body 71 determined by the adjustment position of the switching pressure adjusting screw 75, to a product of the atmospheric pressure Po and a pressure receiving area Ab of the spacer 74 on which the atmospheric pressure Po acts, and a product (Ph×Ab) of the high side pressure Ph and a pressure receiving area Ab of the spacer on which the high side pressure Ph acts.

When the high side pressure Ph rises to result in Po×Ab+ Fs<Ph×Ab, the valve body 71 slides upward so that the first through hole 711 of the valve body 71 communicates with the first inlet 58 of the condenser 2 as illustrated in FIG. 3. At this time, the second through hole 712 of the valve body 71 does not communicate with the second inlet 59 of the condenser 2.

The refrigerant thus flows into the outer cylinder 73 of the differential pressure valve 7 from the inlet pipe joint 29 as indicated by a solid arrow in FIG. 3 and flows upward through the internal space of the valve body 71. The refrigerant in the valve body 71 then flows into the first space 54 of the first header tank 21 from the first inlet 58 of the condenser 2 through the first through hole 711 of the valve body 71 and the first through hole 731 of the outer cylinder 73.

After flowing into the first space 54, the refrigerant flows through the first passage group 231 of the core 23, the first space 62 of the second header tank 22, and the second passage group 232 of the core 23 to flow into the second space 55 of the first header tank 21. After flowing into the second space 55 of the first header tank 21, the refrigerant flows into the third space 56 of the first header tank 21 via the check valve 520.

After flowing into the third space 56 of the first header tank 21, the refrigerant flows through the third passage group 233 of the core 23 and flows into the second space 63 of the second header tank 22. After flowing into the second space 63 of the second header tank 22, the refrigerant flows into the internal space 200 of the modulator tank 20 via the first communication passage 64 and is separated into gas and liquid. The liquid phase refrigerant obtained by the gas-liquid separation in the internal space 200 of the modulator tank 20 flows into the second space 63 of the second header tank 22 via the second communication passage 65.

After flowing into the second space 63 of the second header tank 22, the liquid phase refrigerant flows through the fourth passage group 234 of the core 23 which is the subcooling portion 2b, and flows into the fourth space 57 of the first header tank 21. After flowing into the fourth space 57 of the first header tank 21, the liquid phase refrigerant flows out to the inlet side of the expansion valve 3 from the outlet pipe joint 28.

Figure 7:
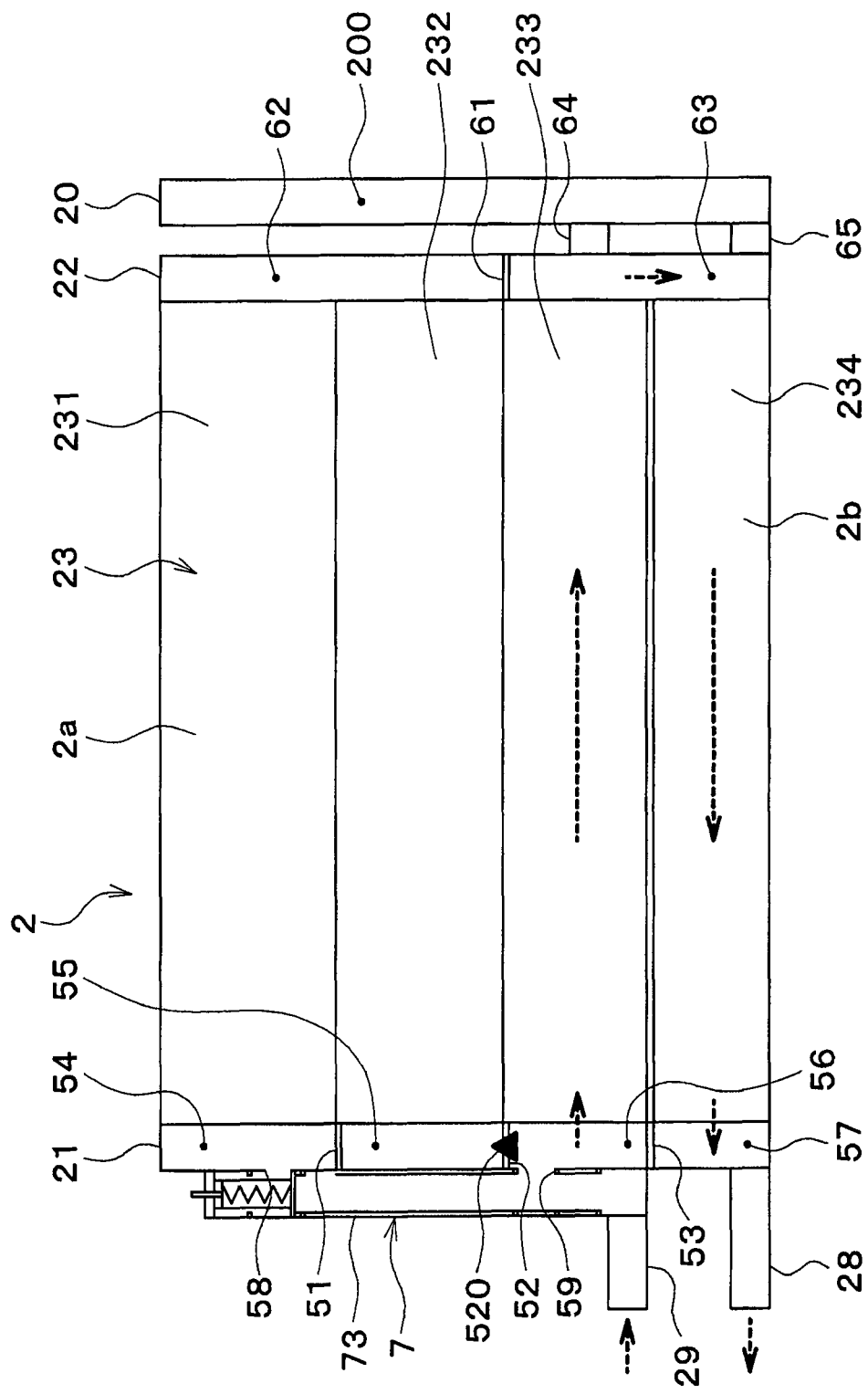
FIG. 7 is an explanatory diagram illustrating the flow of the refrigerant in the condenser when a high side pressure is reduced, according to the first embodiment.

On the other hand, when the high side pressure Ph drops to result in $Po \times Ab + Fs \geq Ph \times Ab$, the valve body 71 slides downward so that the second through hole 712 of the valve body 71 communicates with the second inlet 59 of the condenser 2 as illustrated in FIGS. 4 and 7. At this time, the first through hole 711 of the valve body 71 does not communicate with the first inlet 58 of the condenser 2.

The refrigerant thus flows into the outer cylinder 73 of the differential pressure valve 7 from the inlet pipe joint 29 as indicated by a dotted arrow in FIG. 7, and flows upward through the internal space of the valve body 71. The refrigerant in the valve body 71 then flows into the third space 56 of the first header tank 21 from the second inlet 59 of the condenser 2 through the second through hole 712 of the valve body 71 and the second through hole 732 of the outer cylinder 73.

After flowing into the third space 56 of the first header tank 21, the refrigerant flows through the third passage group 233 of the core 23 and flows into the second space 63 of the second header tank 22. After flowing into the second space 63 of the second header tank 22, the refrigerant flows into the internal space 200 of the modulator tank 20 via the first communication passage 64 and is separated into gas and liquid. The liquid phase refrigerant obtained by the gas-liquid separation in the internal space 200 of the modulator tank 20 flows into the second space 63 of the second header tank 22 via the second communication passage 65.

After flowing into the second space 63 of the second header tank 22, the liquid phase refrigerant flows through the fourth passage group 234 of the core 23 which is the subcooling portion 2b, and flows into the fourth space 57 of the first header tank 21. After flowing into the fourth space 57 of the first header tank 21, the liquid phase refrigerant flows out to the inlet side of the expansion valve 3 from the outlet pipe joint 28.

That is, in the vehicle air conditioner of the present embodiment, when the high side pressure Ph rises to result in $Po \times Ab + Fs \leq Ph \times Ab$, the differential pressure valve 7 performs switching to a refrigerant passage (hereinafter referred to as a first refrigerant passage) that allows the refrigerant to flow throughout the condenser 2 (that is, through all the passage groups 231 to 234 in the core 23). When the high side pressure Ph drops to result in $Po \times Ab + Fs \geq Ph \times Ab$, the differential pressure valve 7 performs switching to a refrigerant passage (hereinafter referred to as a second refrigerant passage) that allows the refrigerant to flow through only a part of the condenser 2 (that is, through the third and fourth passage groups 233 and 234 in the core 23). More specifically, when the high side pressure Ph drops to result in $Po \times Ab + Fs \leq Ph \times Ab$, the differential pressure valve 7 allows a gas phase refrigerant discharged from the compressor 1 to flow into a middle part of the condenser 2, thereby performing switching to the second refrigerant passage that allows the refrigerant to flow through only a part of the condenser 2. In other words, the differential pressure valve 7 switches the refrigerant passage to the second refrigerant passage when the pressure difference between the atmospheric pressure Po and the high side pressure Ph of the refrigeration cycle becomes equal to or smaller than a predetermined reference pressure difference.

Therefore, the differential pressure valve 7 of the present embodiment forms a switching unit that switches the refrigerant passage in the condenser 2 to the first refrigerant passage or the second refrigerant passage.

In the present embodiment, the third passage group 233 and the fourth passage group 234 in the core 23 form a circulating unit through which the refrigerant flows when the differential pressure valve 7 switches the refrigerant passage to the second refrigerant passage. The first passage group 231 and the second passage group 232 of the core 23 form a non-circulating unit through which the refrigerant does not flow when the differential pressure valve 7 switches the refrigerant passage to the second refrigerant passage. At this time, the check valve 520 of the present embodiment plays a role of inhibiting the flow of the refrigerant from the side of the circulating unit to the side of the non-circulating unit when the differential pressure valve 7 switches the refrigerant passage to the second refrigerant passage.

As described above, in the vehicle air conditioner of the present embodiment, the differential pressure valve 7 switches the refrigerant passage in the condenser 2 to the second refrigerant passage when the outside air temperature drops and the high side pressure Ph of the refrigeration cycle 100 drops. At this time, the refrigerant discharged from the compressor flows through only a part of the condenser 2, whereby a heat exchange region (heat exchange area) in which heat exchange occurs between the refrigerant and the outside air in the condenser 2 is reduced.

As a result, the high side pressure Ph of the refrigeration cycle 100 increases, and the flow of the refrigerant circulating through the refrigeration cycle 100 increases so that the cooling capacity (that is, the dehumidifying capacity) of the evaporator can be improved. Therefore, the anti-fog properties of a window can be secured even when the vehicle air conditioner is used in the inside air mode at a low outside air temperature.

Second Embodiment

A second embodiment will be described with reference to FIGS. 8 and 9. The second embodiment is different from the first embodiment in terms of the configuration of the switching unit.

Figure 8:
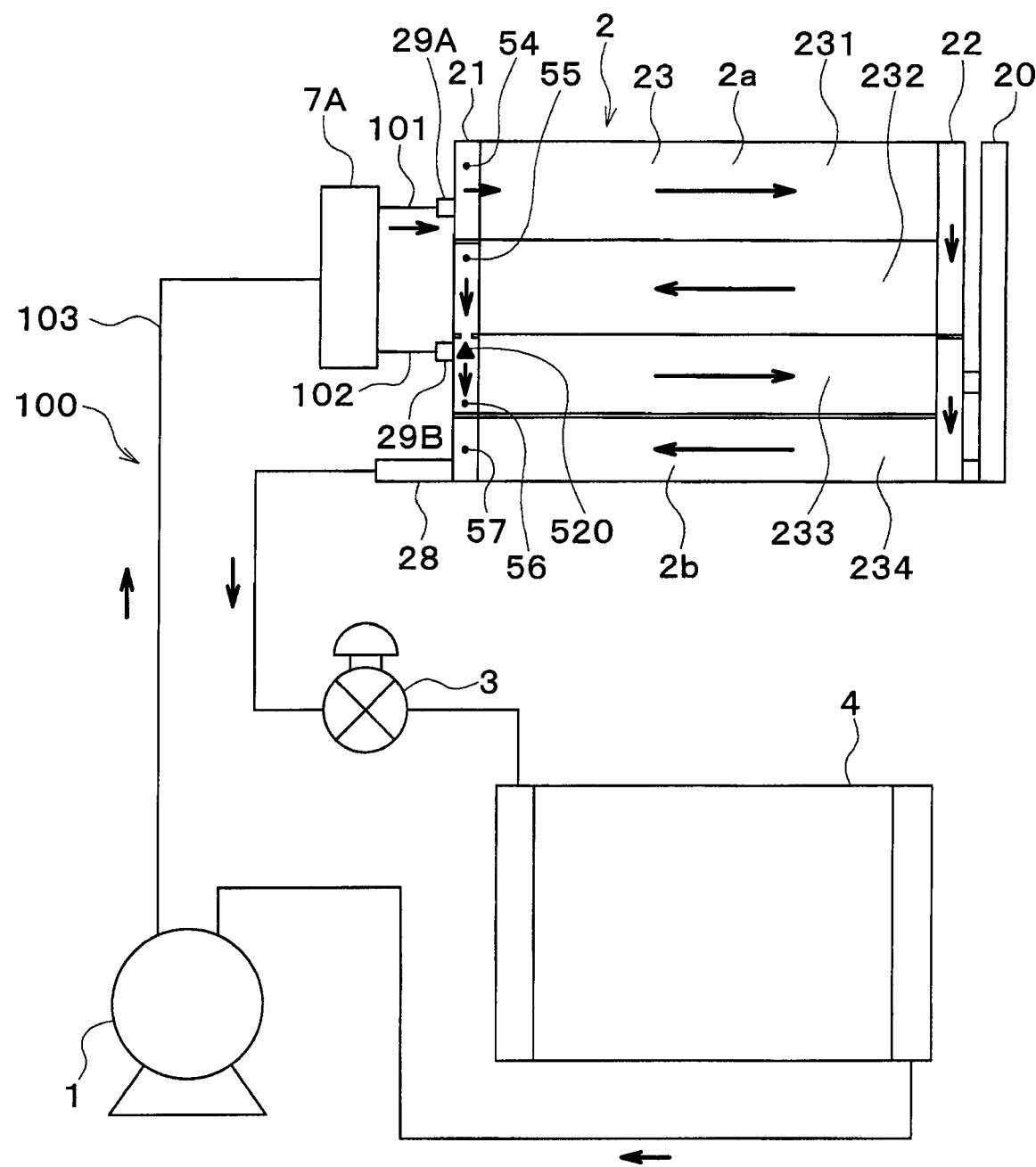
FIG. 8 is a diagram illustrating a flow of a refrigerant in a refrigeration cycle during normal operation, according to a second embodiment.
Figure 9:
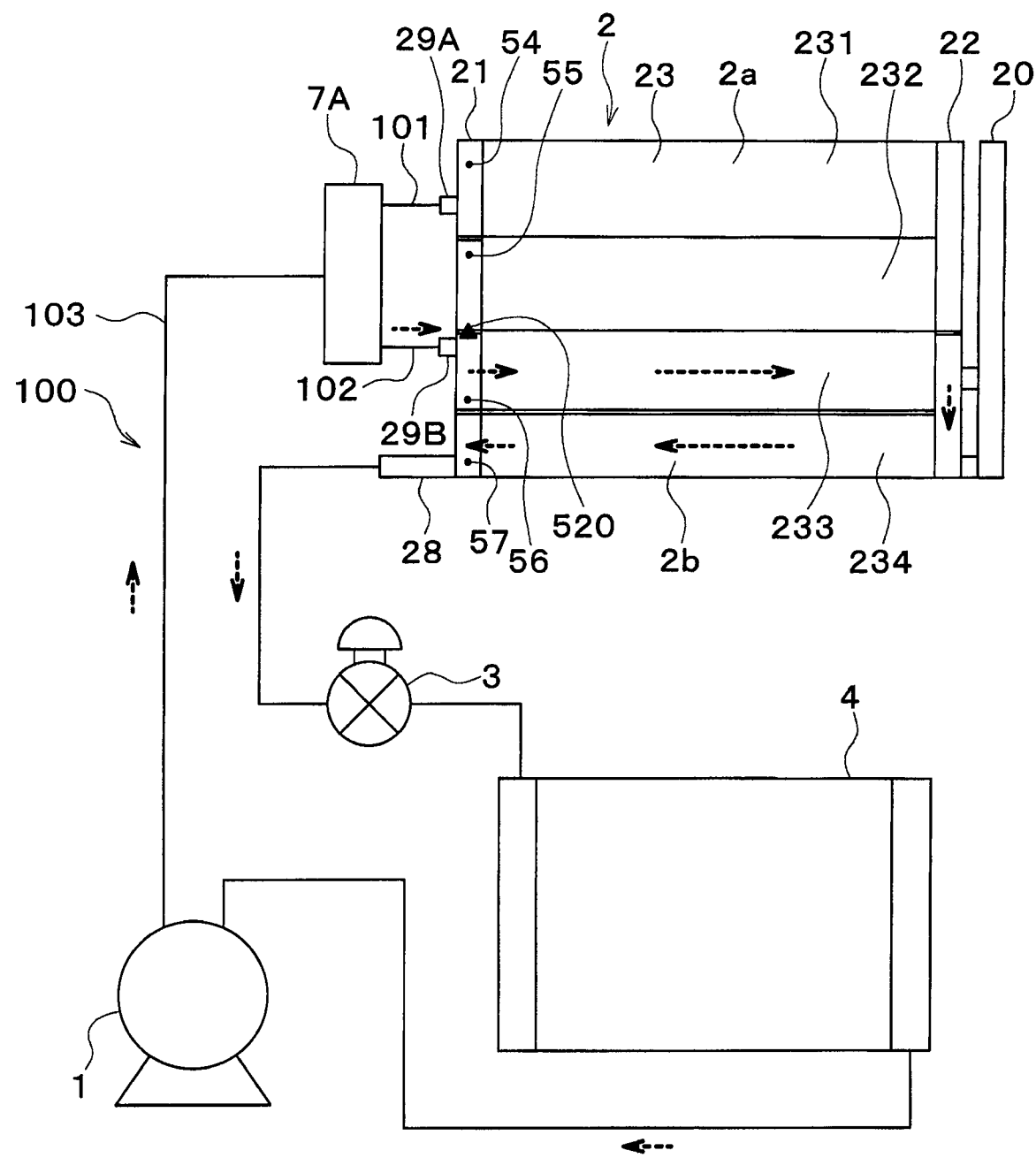
FIG. 9 is a diagram illustrating a flow of the refrigerant in the refrigeration cycle when a high side pressure is reduced, according to the second embodiment.

As illustrated in FIG. 8, a first inlet pipe joint 29A and a second inlet pipe joint 29B are connected to the first header tank 21 of the condenser 2. A first inflow passage 101 is connected to the first inlet pipe joint 29A to allow the refrigerant to flow into the first space 54 of the first header tank 21. A second inflow passage 102 is connected to the second inlet pipe joint 29B to allow the refrigerant to flow into the third space 56 of the first header tank 21. The first inlet pipe joint 29A and the second inlet pipe joint 29B are each joined to the outer wall of the first header tank 21.

A discharge refrigerant passage 103 through which the refrigerant discharged from the compressor 1 flows is connected to a refrigerant discharge side of the compressor 1. A mechanical thermostat 7A is provided on the refrigerant discharge side of the compressor 1 and a refrigerant inlet side of the condenser 2. The thermostat 7A is disposed at a junction of the discharge refrigerant passage 103 and the first and second inflow passages 101 and 102. The thermostat 7A is a refrigerant temperature responsive valve including a mechanical mechanism that switches the passage between the first inflow passage 101 and the second inflow passage 102 by opening/closing the refrigerant passage with a displacement of a valve body using a thermowax (thermosensitive member) whose volume varies with temperature. Thus, the thermostat 7A of the present embodiment forms the switching unit.

Specifically, when the refrigerant temperature on the inlet side of the condenser 2 exceeds a predetermined reference refrigerant temperature, the thermostat 7A switches the refrigerant passage on the inlet side of the condenser 2 to the first inflow passage 101. As a result, as indicated by solid arrows in FIG. 8, the refrigerant discharged from the compressor 1 flows through the discharge refrigerant passage 103 and then the first inflow passage 101 to flow into the first space 54 of the first header tank 21 through the first inlet pipe joint 29A of the condenser 2. As in the first embodiment, the refrigerant flowing into the first space 54 flows throughout the core 23 and flows out to the inlet side of the expansion valve 3 from the outlet pipe joint 28.

On the other hand, when the refrigerant temperature on the inlet side of the condenser 2 is lower than or equal to the reference refrigerant temperature, the thermostat 7A switches the refrigerant passage on the inlet side of the condenser 2 to the second inflow passage 102. As a result, as indicated by dotted arrows in FIG. 9, the refrigerant discharged from the compressor 1 flows through the discharge refrigerant passage 103 and then the second inflow passage 102 to flow into the third space 56 of the first header tank 21 through the second inlet pipe joint 29B of the condenser 2. As in the first embodiment, the refrigerant flowing into the third space 56 flows through the third passage group 233 and the fourth passage group 234 of the core 23 and flows out to the inlet side of the expansion valve 3 from the outlet pipe joint 28.

According to the present embodiment, the thermostat 7A switches the refrigerant passage in the condenser 2 to the second refrigerant passage when the high side pressure Ph of the refrigeration cycle 100 drops with a decrease in the outside air temperature. Therefore, the effect similar to that of the first embodiment can be obtained.

Third Embodiment

Figure 11:
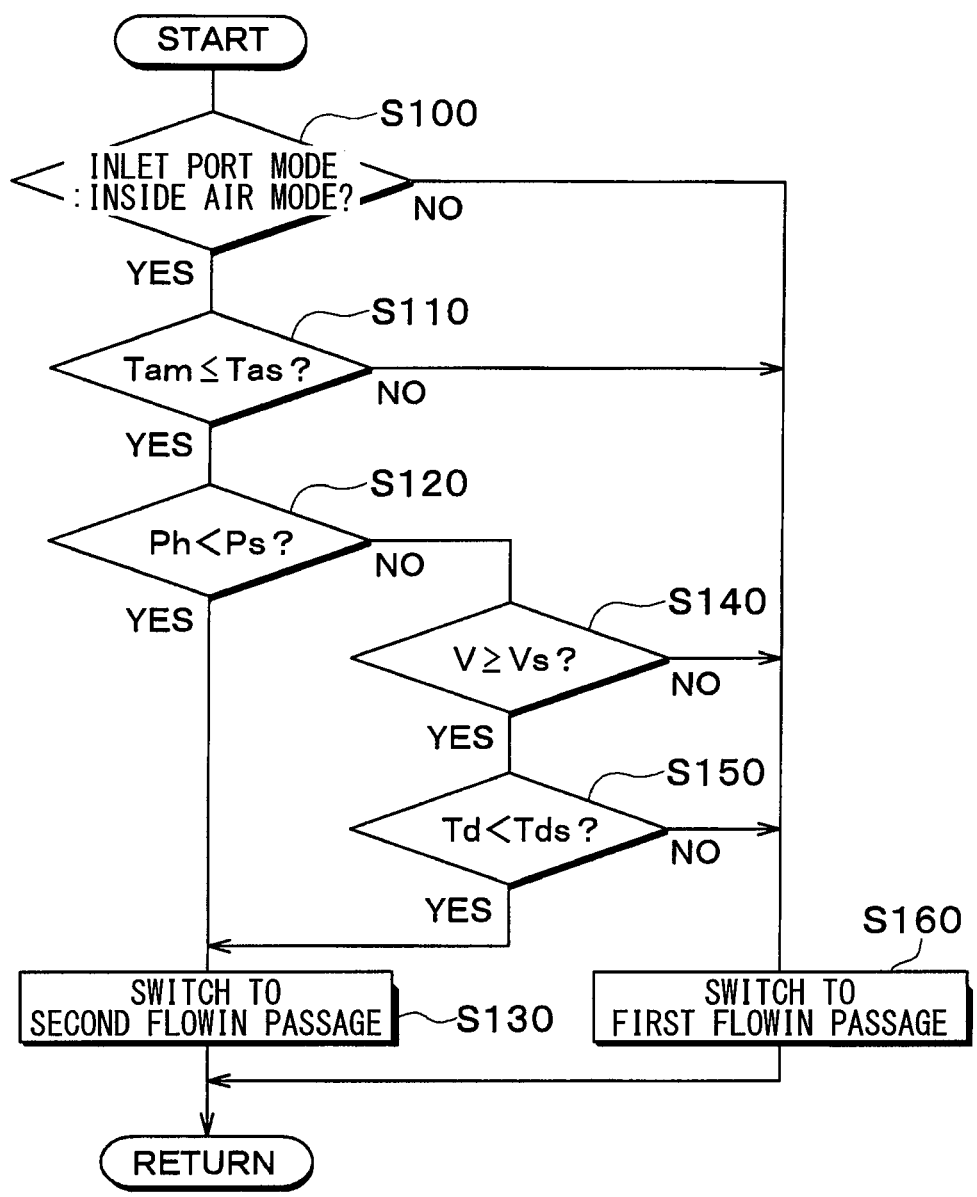
FIG. 11 is a flowchart illustrating control processing executed by a controller of a vehicle air conditioner according to the third embodiment.
Figure 12:
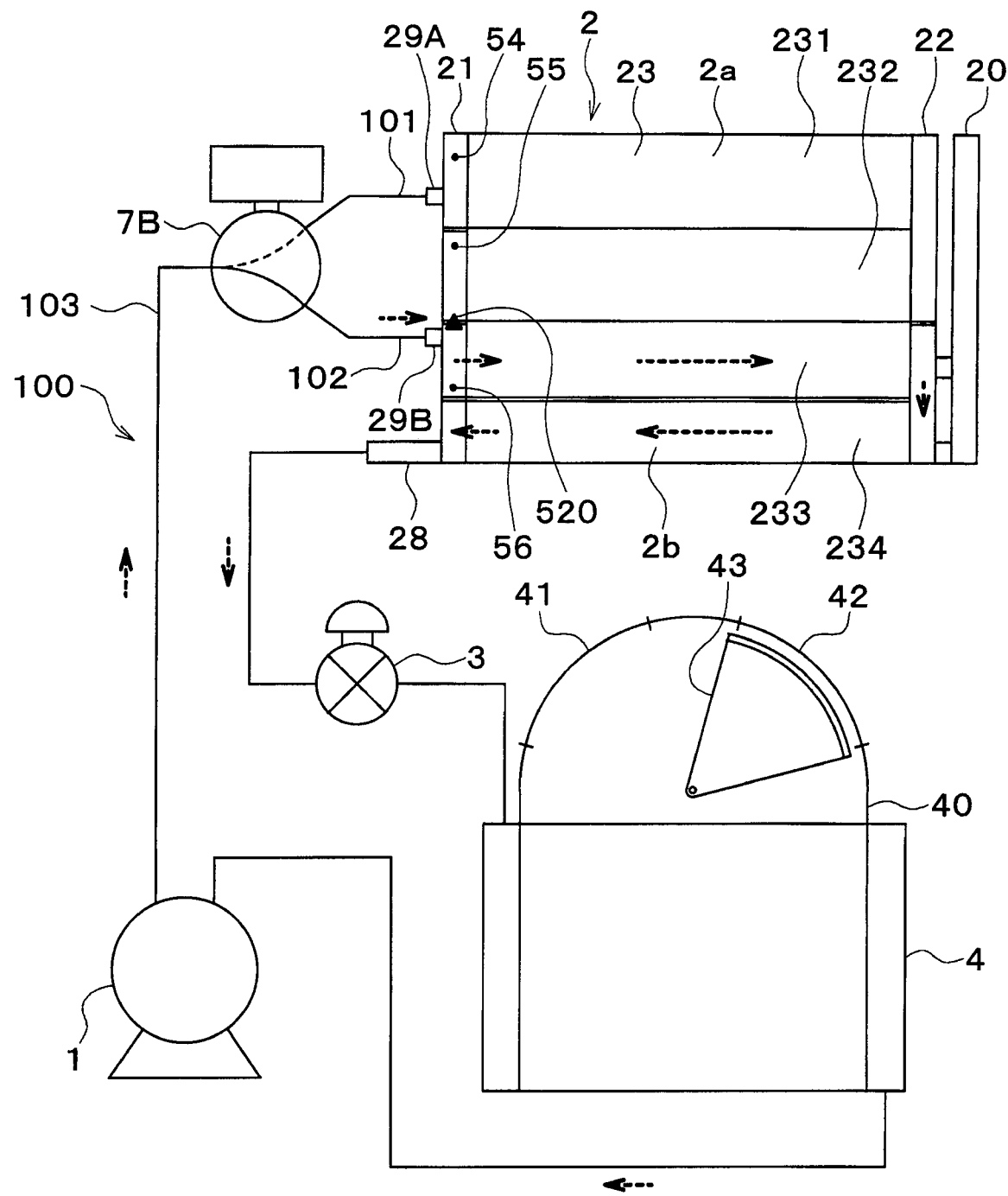
FIG. 12 is a diagram illustrating a flow of the refrigerant in the refrigeration cycle when a high side pressure is reduced, according to the third embodiment.

A third embodiment will be described with reference to FIGS. 10 to 12. The third embodiment is different from the second embodiment in terms of the configuration of the switching unit.

Figure 10:
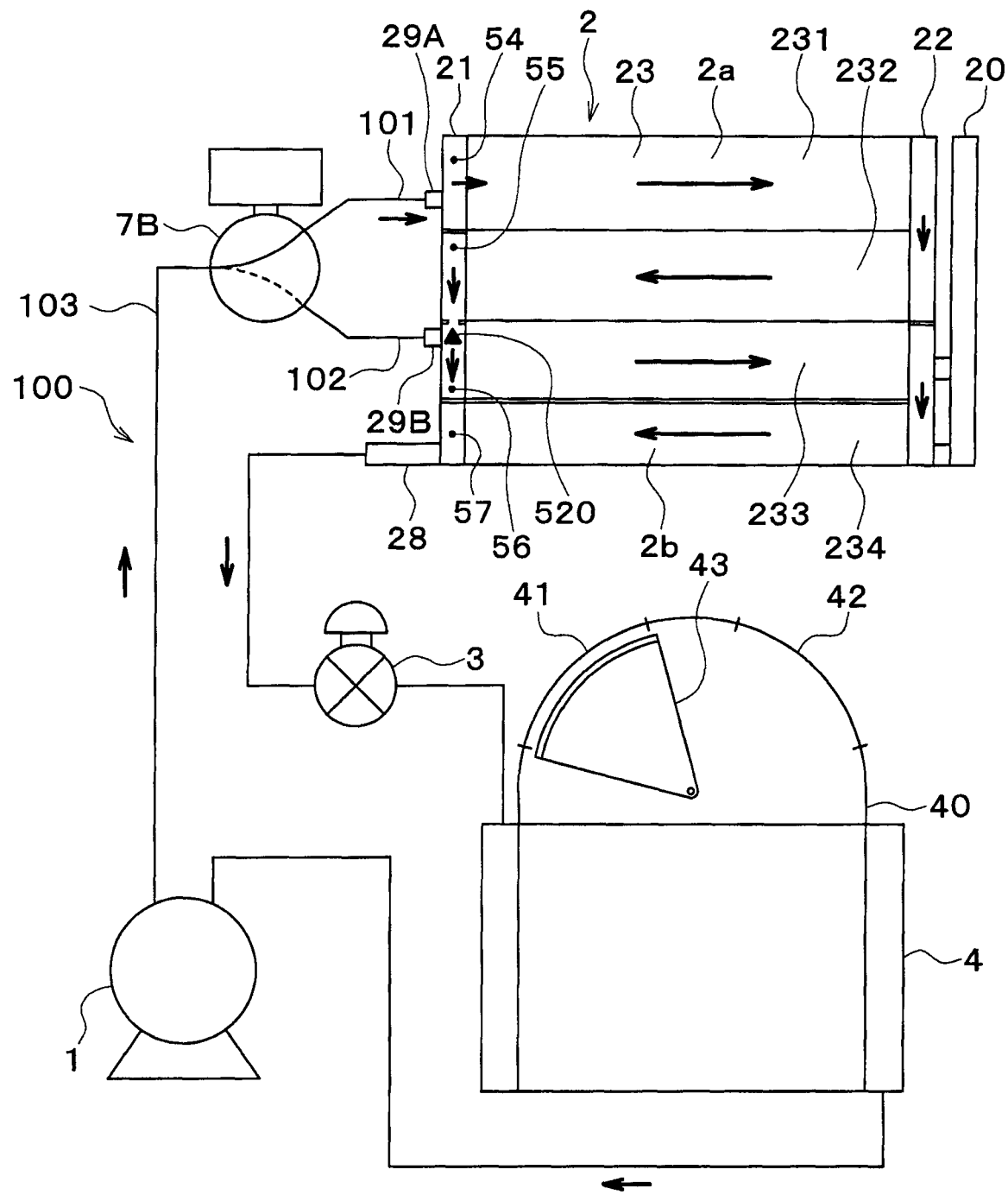
FIG. 10 is a diagram illustrating a flow of a refrigerant in a refrigeration cycle during normal operation, according to a third embodiment.

As illustrated in FIG. 10, a three-way valve 7B that switches the refrigerant passage by an electric mechanism is disposed at the junction of the discharge refrigerant passage 103, the first inflow passage 101, and the second inflow passage 102. The three-way valve 7B is a refrigerant flow switching valve that switches the flow between a state in which the discharge side of the compressor 1 communicates with the first inlet pipe joint 29A of the condenser 2 and a state in which the discharge side of the compressor 1 communicates with the second inlet pipe joint 29B of the condenser 2.

That is, the three-way valve 7B is a passage switching valve that switches the passage between a state in which the discharge refrigerant passage 103 communicates with the first inflow passage 101 and a state in which the discharge refrigerant passage 103 communicates with the second inflow passage 102. In other words, the three-way valve 7B is a switching valve that switches the passage between the first inflow passage 101 and the second inflow passage 102 as the refrigerant passage connecting the discharge side of the compressor 1 to the inlet side of the condenser 2. Thus, the three-way valve 7B of the present embodiment forms the switching unit. The operation of the three-way valve 7B is controlled by a controller (not shown).

During normal operation of the refrigeration cycle 100, the three-way valve 7B switches the passage to the first inflow passage 101, or the state in which the discharge side of the compressor 1 communicates with the first inlet pipe joint 29A of the condenser 2. As a result, during normal operation, the refrigerant flows throughout the core 23 of the condenser 2 as indicated by solid arrows in FIG. 10.

The evaporator 4 of the present embodiment is accommodated in a case 40 of an indoor air conditioning unit. The case 40 of the indoor air conditioning unit forms an air passage that introduces inside or outside air and blows the air into the passenger compartment.

An inside air introduction port 41 and an outside air introduction port 42 are formed in the case of the indoor air conditioning unit on the uppermost stream side of the air flow. The inside air introduction port 41 is an air introduction port for introducing the inside air into the case 40. The outside air introduction port 42 is an air introduction port for introducing the outside air into the case 40.

An inside/outside air switching door 43 is disposed in the case 40 of the indoor air conditioning unit. The inside/outside air switching door 43 continuously adjusts the area of an opening of each of the inside air introduction port 41 and the outside air introduction port 42. The inside/outside air switching door 43 is an air volume ratio changing unit that changes a ratio between the volume of the inside air and the volume of the outside air introduced into the case 40. In other words, the inside/outside air switching door 43 is an inside/outside air switching unit that switches the mode between an inside air mode in which the inside air is introduced into the evaporator 4 with no outside air introduced therein, and a non-inside air mode in which at least the outside air is introduced into the evaporator 4.

The inside/outside air switching door 43 is driven by an electric actuator (not shown). The operation of the electric actuator is controlled by a control signal output from a controller (not shown).

The inside/outside air switching door 43 of the present embodiment is an inlet switching unit that switches an inlet mode. The inlet mode includes the inside air mode, an outside air mode, and a mixed inside/outside air mode, for example. In the inside air mode, the inside air is introduced into the air passage in the case 40 with the inside air introduction port 41 fully open and the outside air introduction port 42 fully closed. In the outside air mode, the outside air is introduced into the air passage in the case 40 with the inside air introduction port 41 fully closed and the outside air introduction port 42 fully open.

In the mixed inside/outside air mode, a ratio of the inside air and the outside air introduced into the air passage in the case 40 is continuously changed by continuously adjusting the area of the opening of each of the inside air introduction port 41 and the outside air introduction port 42 between the inside air mode and the outside air mode.

Next, the operation in the above configuration will be described. When the compressor 1 is started, the controller executes control processing illustrated in a flowchart of FIG. 11. The flowchart illustrated in FIG. 11 is the control processing executed at predetermined intervals as a subroutine for a main routine of an air conditioning control program.

First, in step S100, it is determined whether or not the inlet mode is the inside air mode. If the inlet mode is the inside air mode, moisture is trapped in the passenger compartment to cause an increase in humidity inside the passenger compartment, so that a window is easily fogged. Step S100 thus determines whether or not a window is possibly fogged.

If it is determined in step S100 that the inlet mode is the inside air mode, the processing proceeds to step S110 assuming that the window is possibly fogged. On the other hand, if it is not determined in step S100 that the inlet mode is the inside air mode, the processing proceeds to step S160 assuming that the window is less likely to be fogged, whereby the three-way valve 7B is switched to the side of the first inflow passage 101 and the processing returns to the main routine.

In step S110, it is determined whether or not an outside air temperature Tam is lower than or equal to a predetermined reference outside air temperature Tas. When the outside air temperature Tam is low, the difference between the outside air temperature Tam and the temperature in the passenger compartment increases so that a window is easily fogged. Step S110 thus determines whether or not a window is possibly fogged.

If it is determined in step S110 that the outside air temperature Tam is lower than or equal to the reference outside air temperature Tas, the processing proceeds to step S120 assuming that the window is possibly fogged. On the other hand, if it is not determined in step S110 that the outside air temperature Tam is lower than or equal to the reference outside air temperature Tas, the processing proceeds to step S160 assuming that the window is less likely to be fogged, whereby the three-way valve 7B is switched to the side of the first inflow passage 101 and the processing returns to the main routine.

In step S120, it is determined whether or not the high side pressure Ph of the refrigeration cycle 100 is lower than a predetermined reference pressure Ps. The high side pressure Ph of the refrigeration cycle 100 refers to the refrigerant pressure Ph on the inlet side of the condenser 2. The high side pressure Ph is detected by a high side pressure sensor (not shown).

When the high side pressure Ph of the refrigeration cycle 100 decreases, the difference between the high side pressure Ph and the low side pressure of the refrigeration cycle 100 is reduced. At this time, the condensing capacity of the condenser 2 becomes too high so that the liquid phase refrigerant accumulates in most areas of the condenser 2, and the flow of the refrigerant flowing out to the side of the evaporator 4 is reduced.

If it is determined in step S120 that the high side pressure Ph of the refrigeration cycle 100 is lower than the reference pressure Ps, the processing proceeds to step S130 assuming that the flow of the refrigerant flowing out to the side of the evaporator 4 is reduced.

In step S130, the three-way valve 7B is switched to the side of the second inflow passage 102 to allow the discharge side of the compressor 1 to communicate with the second inlet pipe joint 29B of the condenser 2. As a result, the refrigerant flows through only the third passage group 233 and the fourth passage group 234 being a part of the core 23 in the condenser 2, as indicated by dotted arrows in FIG. 12.

On the other hand, if it is not determined in step S130 that the high side pressure Ph of the refrigeration cycle 100 is lower than the reference pressure Ps, the processing proceeds to step S140 assuming that the flow of the refrigerant flowing out to the side of the evaporator 4 is not reduced.

In step S140, it is determined whether or not a vehicle speed V is higher than or equal to a predetermined reference vehicle speed Vs. The condenser 2 is typically disposed at the front of a vehicle. Thus, an increase in the vehicle speed V increases the volume of the outside air (draft) fed to the condenser 2, thereby decreasing the high side pressure Ph of the refrigeration cycle 100. As a result, the difference between the high side pressure Ph and the low side pressure of the refrigeration cycle 100 is likely to be reduced.

If it is determined in step S140 that the vehicle speed V is higher than or equal to the reference vehicle speed Vs, the processing proceeds to step S150 assuming a condition in which the difference between the high side pressure Ph and the low side pressure of the refrigeration cycle 100 is likely to be reduced. On the other hand, if it is not determined that the vehicle speed V is higher than or equal to the reference vehicle speed Vs, the processing proceeds to step S160 assuming a condition in which the difference between the high side pressure Ph and the low side pressure of the refrigeration cycle 100 is not likely to be reduced, whereby the three-way valve 7B is switched to the side of the first inflow passage 101 and the processing returns to the main routine.

In step S150, it is determined whether or not the refrigerant temperature Td on the inlet side of the condenser 2 (hereinafter referred to as a condenser inlet refrigerant temperature) is lower than a predetermined reference refrigerant temperature Tds. The condenser inlet refrigerant temperature Td is detected by a refrigerant temperature sensor (not shown).

A decrease in the condenser inlet refrigerant temperature Td decreases the difference between the high side pressure Ph and the low side pressure of the refrigeration cycle 100, thereby reducing the flow of the refrigerant flowing out to the side of the evaporator 4.

If it is determined in step S150 that the condenser inlet refrigerant temperature Td is lower than the reference refrigerant temperature Tds, the processing proceeds to step S130 assuming that the flow of the refrigerant flowing out to the side of the evaporator 4 is reduced. On the other hand, if it is not determined in step S150 that the condenser inlet refrigerant temperature Td is lower than the reference refrigerant temperature Tds, the processing proceeds to step S160 assuming that the flow of the refrigerant flowing out to the side of the evaporator 4 is not reduced and a window is less likely to be fogged, whereby the three-way valve 7B is switched to the side of the first inflow passage 101, and the processing returns to the main routine.

According to the present embodiment, the three-way valve 7B switches the refrigerant passage in the condenser 2 to the second refrigerant passage when the high side pressure Ph of the refrigeration cycle 100 drops with a decrease in the outside air temperature. Therefore, the effect similar to that of the first embodiment can be obtained.

Fourth Embodiment

Figure 14:
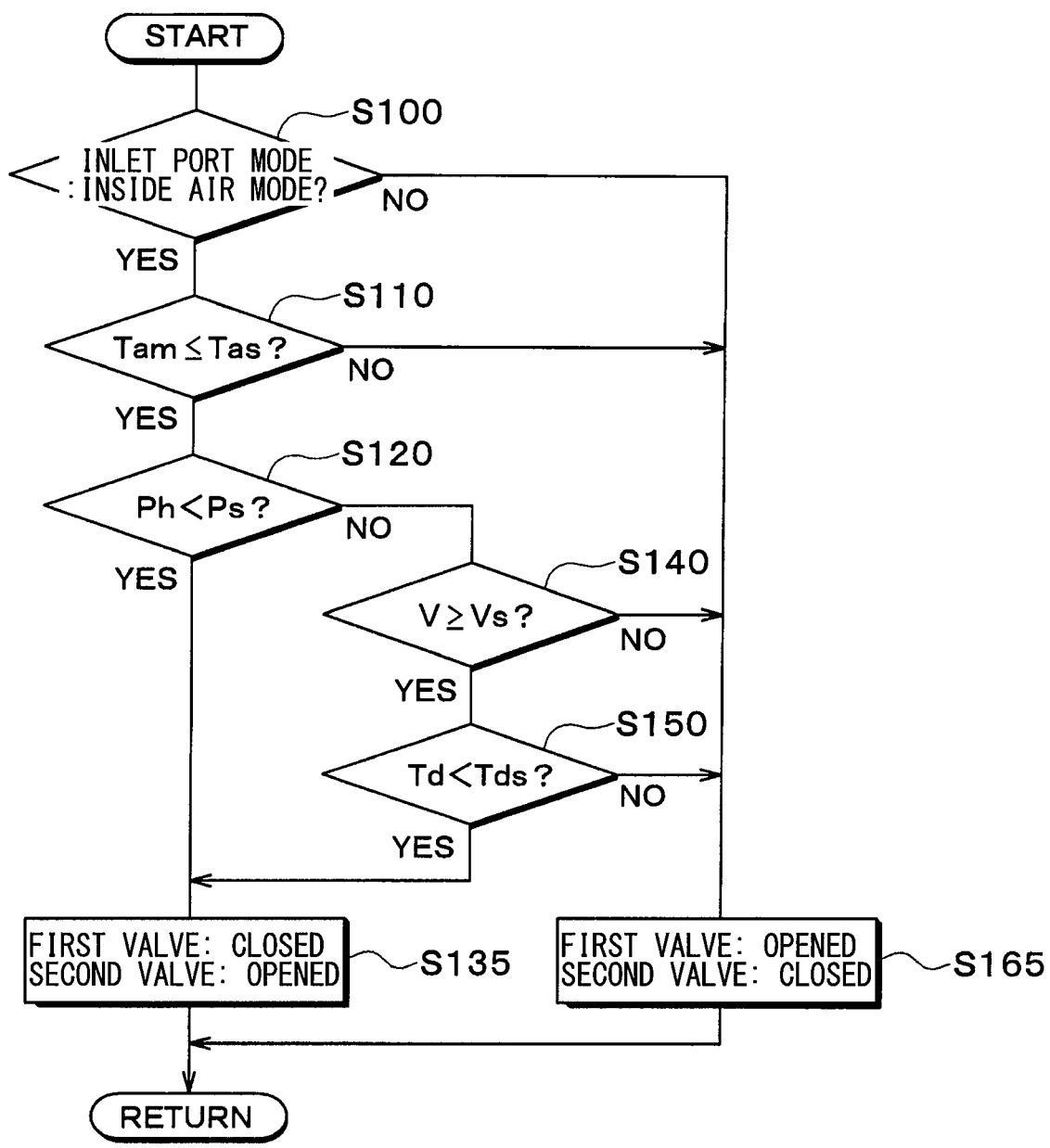
FIG. 14 is a flowchart illustrating control processing executed by a controller of a vehicle air conditioner according to the fourth embodiment.
Figure 15:
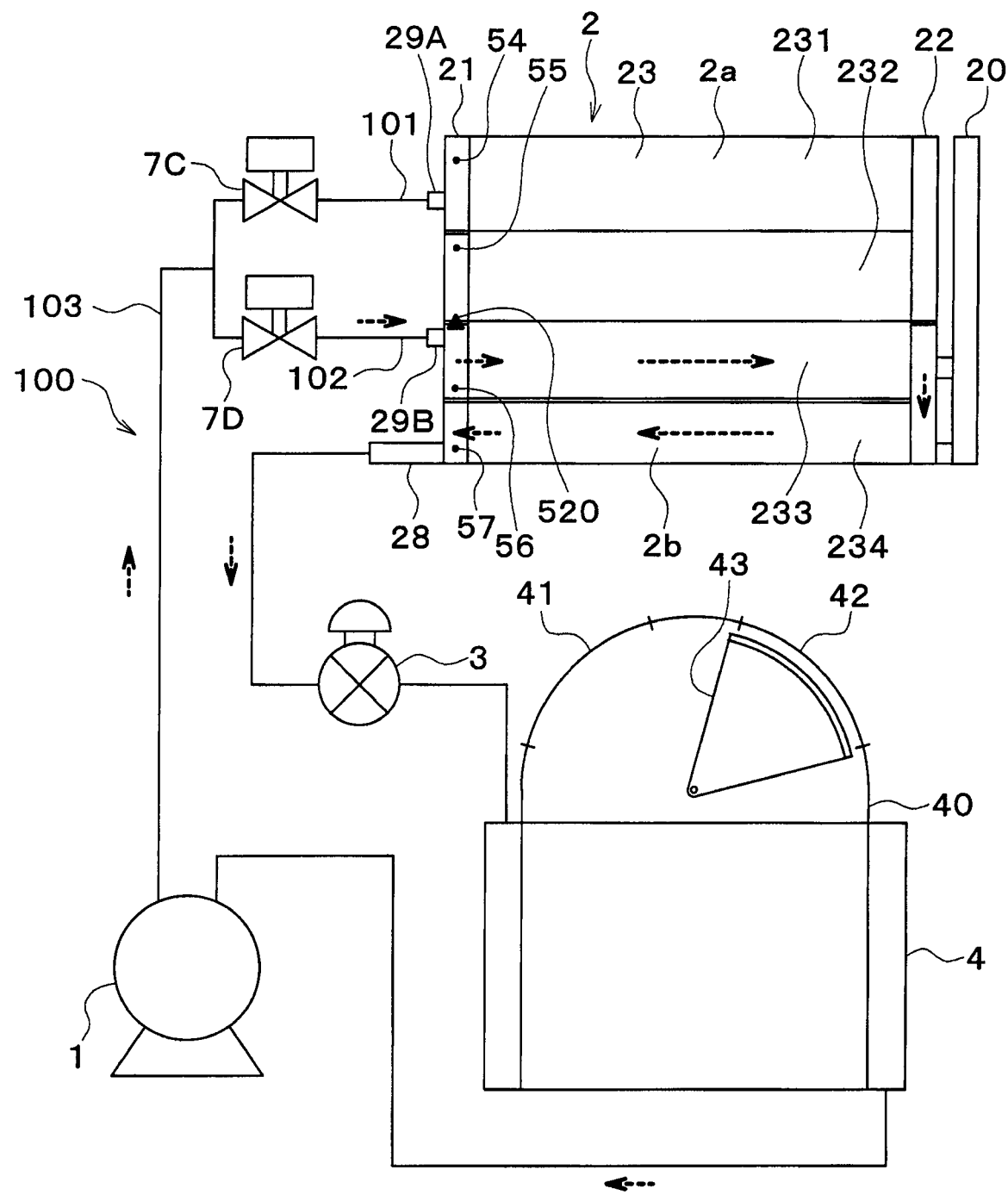
FIG. 15 is a diagram illustrating a flow of the refrigerant in the refrigeration cycle when a high side pressure is reduced, according to the fourth embodiment.

A fourth embodiment will be described with reference to FIGS. 13 to 15. The fourth embodiment is different from the third embodiment in terms of the configuration of the switching unit.

Figure 13:
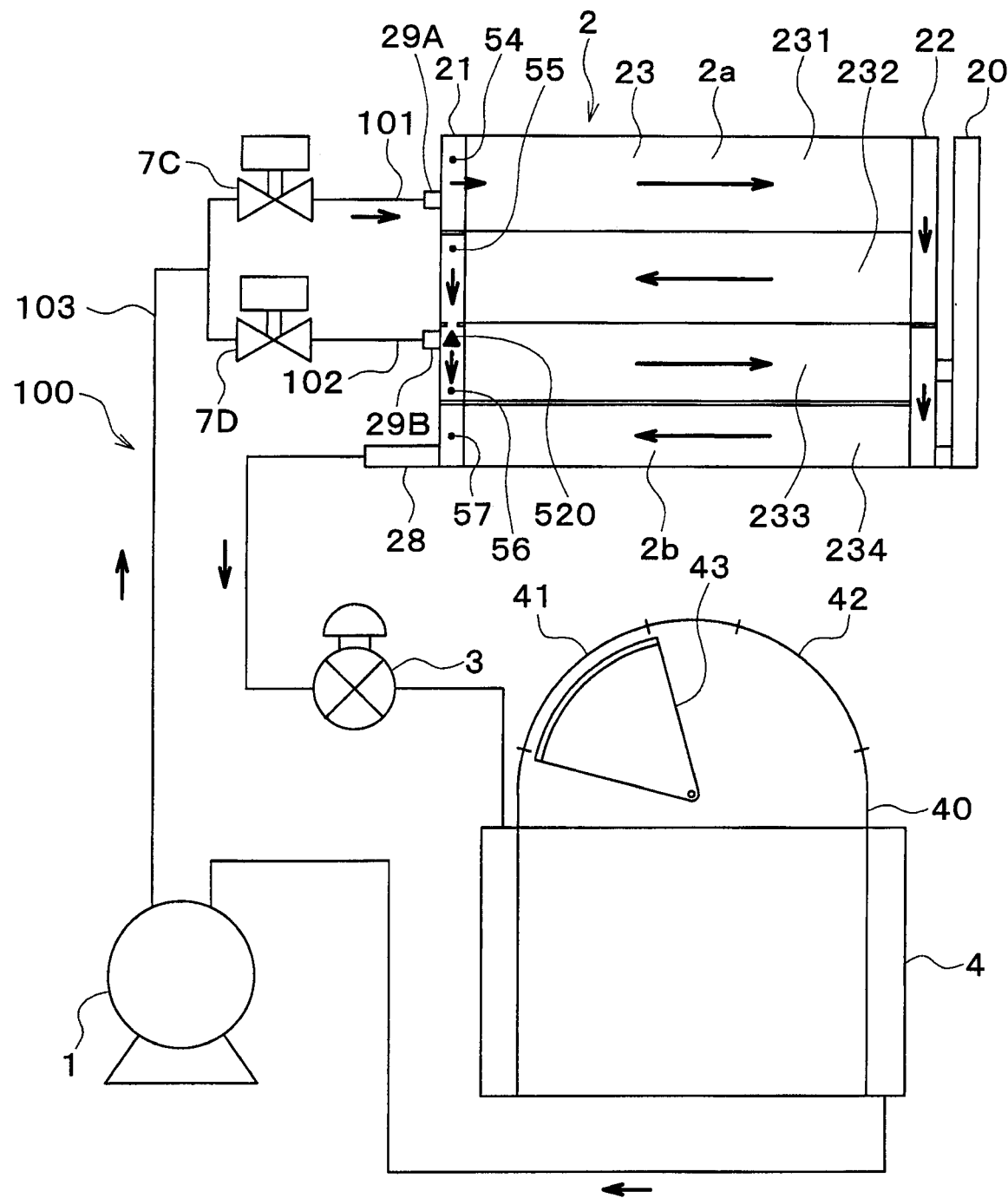
FIG. 13 is a diagram illustrating a flow of a refrigerant in a refrigeration cycle during normal operation, according to a fourth embodiment.

As illustrated in FIG. 13, a first on/off valve 7C is disposed at a junction of the discharge refrigerant passage 103 and the first inflow passage 101. A second on/off valve 7D is disposed at a junction of the discharge refrigerant passage 103 and the second inflow passage 102.

When the first on/off valve 7C is opened and the second on/off valve 7D is closed, the discharge side of the compressor 1 communicates with the first inlet pipe joint 29A of the condenser 2. On the other hand, when the first on/off valve 7C is closed and the second on/off valve 7D is opened, the discharge side of the compressor 1 communicates with the second inlet pipe joint 29B of the condenser 2.

Thus, the first on/off valve 7C and the second on/off valve 7D are refrigerant flow switching means that switches the flow between a state in which the discharge side of the compressor 1 communicates with the first inlet pipe joint 29A of the condenser 2 and a state in which the discharge side of the compressor 1 communicates with the second inlet pipe joint 29B of the condenser 2.

That is, the first on/off valve 7C and the second on/off valve 7D are passage switching means that switches the passage between a state in which the discharge refrigerant passage 103 communicates with the first inflow passage 101 and a state in which the discharge refrigerant passage 103 communicates with the second inflow passage 102. In other words, the first on/off valve 7C and the second on/off valve 7D are switching means that switches the passage between the first inflow passage 101 and the second inflow passage 102 as the refrigerant passage connecting the discharge side of the compressor 1 to the inlet side of the condenser 2. Thus, the first on/off valve 7C and the second on/off valve 7D of the present embodiment form the switching unit. The operation of the first on/off valve 7C and the second on/off valve 7D is controlled by a controller (not shown).

During normal operation of the refrigeration cycle 100, the first on/off valve 7C is opened and the second on/off valve 7D is closed as in step S165 of a flowchart illustrated in FIG. 14 described later. That is, the first on/off valve 7C and the second on/off valve 7D switch the passage to the first inflow passage 101, or the state in which the discharge side of the compressor 1 communicates with the first inlet pipe joint 29A of the condenser 2. As a result, during normal operation, the refrigerant flows throughout the core 23 of the condenser 2 as indicated by solid arrows in FIG. 13.

Next, the operation in the above configuration will be described. In the third embodiment, the three-way valve 7B is operated to switch the refrigerant passage to the side of the second inflow passage 102 in step S130. In the present embodiment, on the other hand, the first on/off valve 7C and the second on/off valve 7D are operated to switch the refrigerant passage in step S135 of FIG. 14 instead of step S130.

Specifically, in step S135, the first on/off valve 7C is closed and the second on/off valve 7D is opened. As a result, the refrigerant passage is switched to the second inflow passage 102, that is, the refrigerant passage allowing the discharge side of the compressor 1 to communicate with the second inlet pipe joint 29B of the condenser 2, whereby the refrigerant flows through only a part of the core 23 of the condenser 2 as indicated by dotted arrows in FIG. 15.

In the third embodiment, the three-way valve 7B is operated to switch the refrigerant passage to the side of the first inflow passage 101 in step S160. In the present embodiment, on the other hand, the first on/off valve 7C and the second on/off valve 7D are operated to switch the refrigerant passage in step S165 of FIG. 14 instead of step S160.

Specifically, in step S165, the first on/off valve 7C is opened and the second on/off valve 7D is closed. As a result, the refrigerant passage is switched to the first inflow passage 101, and the refrigerant flows throughout the core 23 of the condenser 2 as indicated by solid arrows in FIG. 13.

According to the present embodiment, the first on/off valve 7C and the second on/off valve 7D switch the refrigerant passage in the condenser 2 to the second refrigerant passage when the high side pressure Ph of the refrigeration cycle 100 drops with a decrease in the outside air temperature. Therefore, the effect similar to that of the third embodiment can be obtained.

Fifth Embodiment

A fifth embodiment will be described with reference to FIG. 16. The fifth embodiment is different from the first embodiment in terms of the configuration of the condenser 2.

Figure 16:
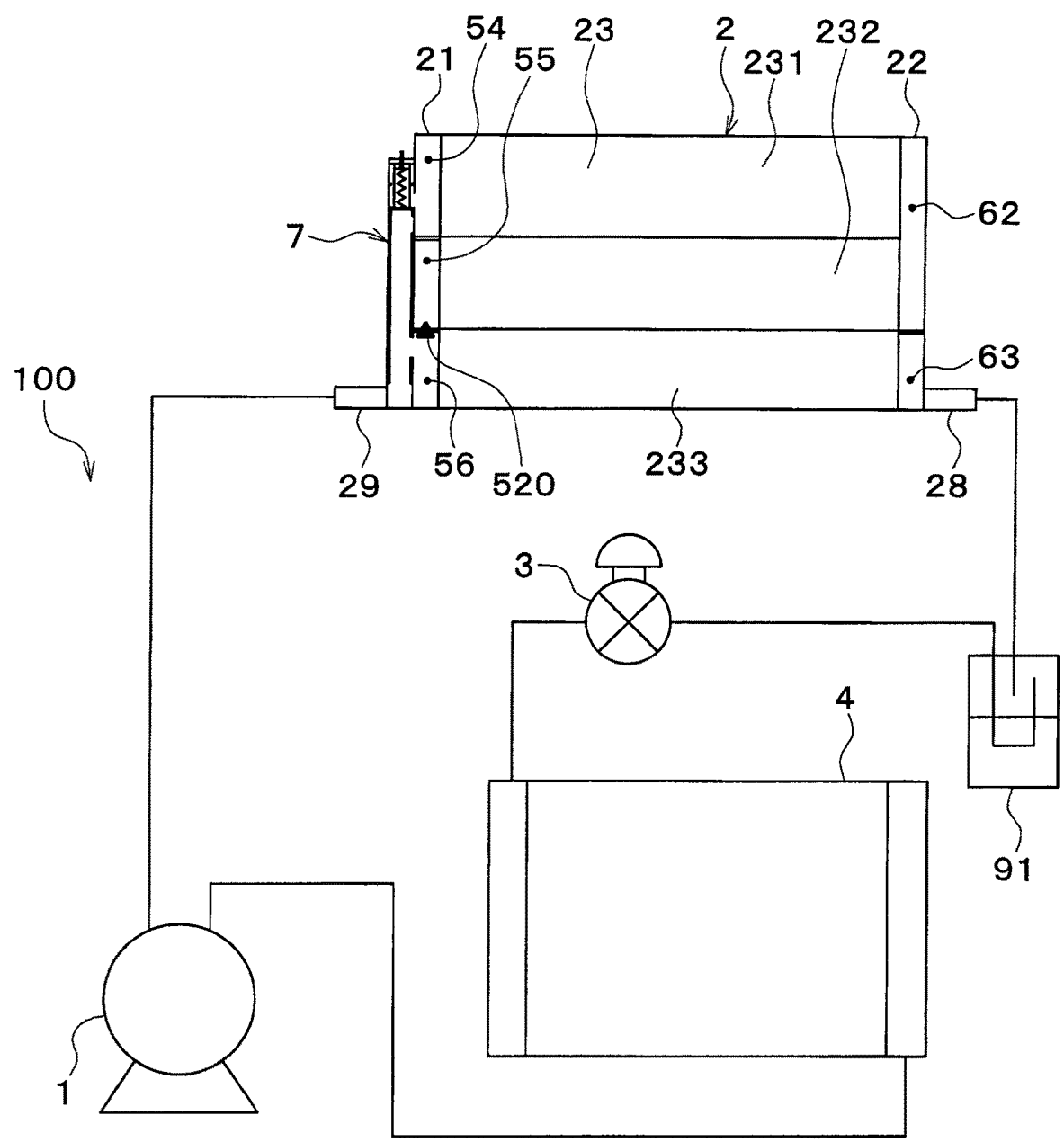
FIG. 16 is a diagram illustrating a refrigeration cycle of a vehicle air conditioner according to a fifth embodiment.

As illustrated in FIG. 16, the subcooling portion 2b and the modulator tank 20 are removed from the condenser 2 of the present embodiment. Accordingly, the core 23 of the condenser 2 includes three passage groups being the first passage group 231, the second passage group 232, and the third passage group 233. The outlet pipe joint 28 is joined to a lower end side, in the vertical direction, of the second header tank 22, that is, a part thereof corresponding to the second space 63.

The refrigeration cycle 100 of the present embodiment includes a receiver tank 91 instead of the modulator tank 20 of the condenser 2. The receiver tank 91 is a gas-liquid separating unit that separates the refrigerant entering the tank into gas and liquid, and accumulates surplus refrigerant in the cycle. A refrigerant inlet of the receiver tank 91 is connected to the side of the outlet of the condenser 2 (the outlet pipe joint 28). A liquid phase refrigerant outlet of the receiver tank 91 is connected to the side of the inlet of the expansion valve 3.

The present embodiment can also obtain the effect similar to that of the first embodiment.

Sixth Embodiment

A sixth embodiment will be described with reference to FIG. 17. The sixth embodiment is different from the first embodiment in terms of the configuration of the refrigeration cycle 100.

Figure 17:
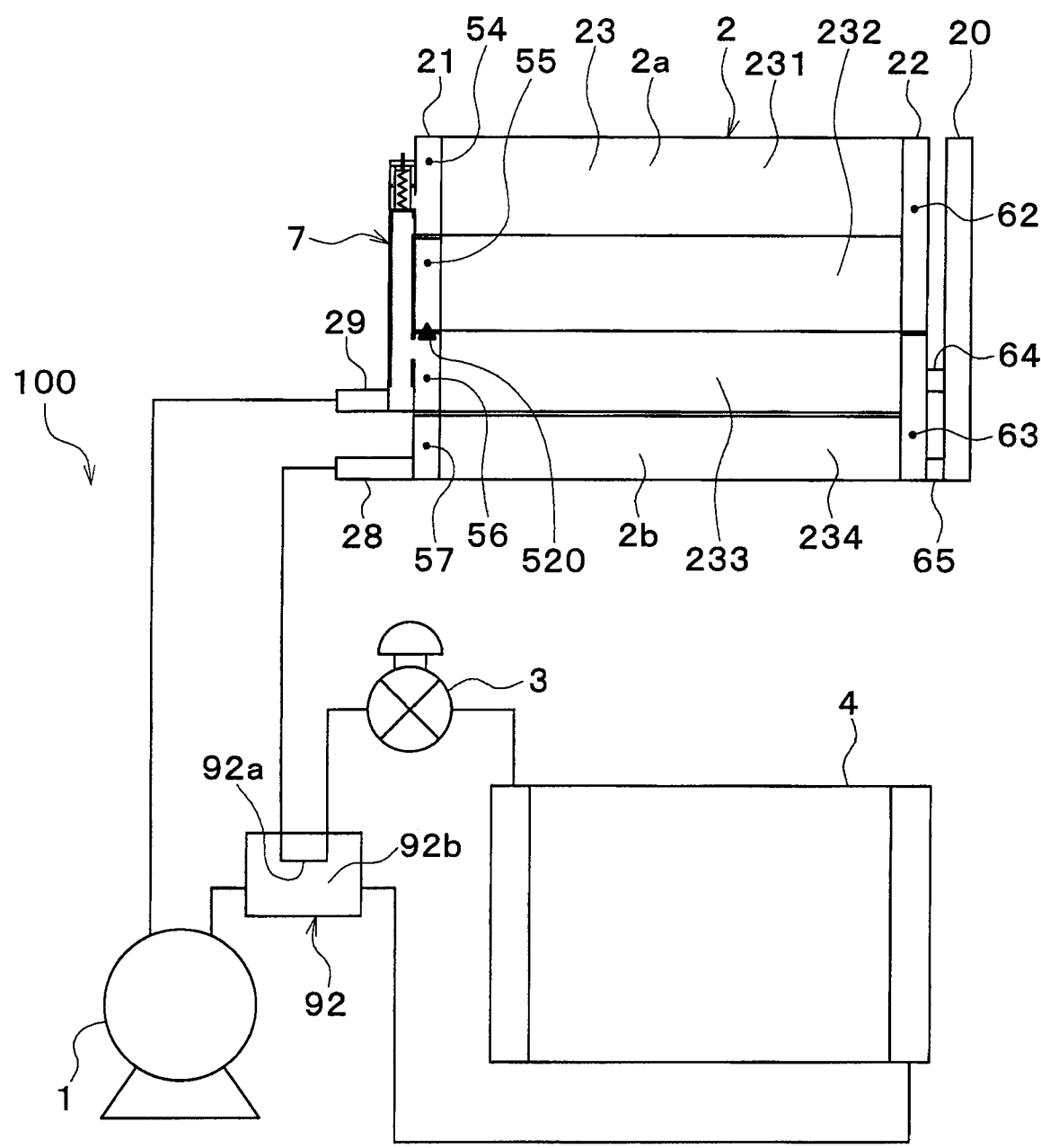
FIG. 17 is a diagram illustrating a refrigeration cycle of a vehicle air conditioner according to a sixth embodiment.

As illustrated in FIG. 17, the refrigeration cycle 100 of the present embodiment includes an internal heat exchanger 92 that allows indirect heat exchange between the high pressure, high temperature liquid refrigerant flowing out of the condenser 2 and the low pressure, low temperature gas phase refrigerant flowing out of the evaporator 4.

The internal heat exchanger 92 includes a high pressure refrigerant passage 92a and a low pressure refrigerant passage 92b. The high pressure refrigerant passage 92a is a passage through which the high pressure refrigerant flowing out of the condenser 2 flows. The low pressure refrigerant passage 92b is a passage through which the low pressure refrigerant flowing out of the evaporator 4 flows.

The high pressure refrigerant passage 92a is disposed downstream of the condenser 2 along the refrigerant flow and upstream of the expansion valve 3 along the refrigerant flow. The low pressure refrigerant passage 92b is disposed downstream of the evaporator 4 along the refrigerant flow and on the refrigerant intake side of the compressor 1.

The present embodiment allows heat exchange between the high pressure refrigerant flowing out of the condenser 2 and the low pressure refrigerant subjected to heat exchange and flowing out of the evaporator 4, thereby being able to cool the high pressure refrigerant with the low pressure refrigerant and reduce the enthalpy of the refrigerant on the inlet side of the evaporator 4. Therefore, the enthalpy difference between the refrigerant on the outlet side and the refrigerant on the inlet side (in other words, the refrigerating capacity) of the evaporator 4 increases to be able to improve the coefficient of performance (the so-called COP) of the cycle.

Other Embodiment

The present disclosure is not limited to the above-mentioned embodiments, and may have various modifications as described below without departing from the gist of the present disclosure.

Modification (1)

The means disclosed in each of the above embodiments may be combined as appropriate within the feasible range. For example, as illustrated in FIGS. 18 and 19, the subcooling portion 2b and the modulator tank 20 may be removed from the condenser 2 of the refrigeration cycle 100 in which any of the thermostat 7A, the three-way valve 7B, and the two on/off valves 7C and 7D is adopted as the switching unit.

Figure 18:
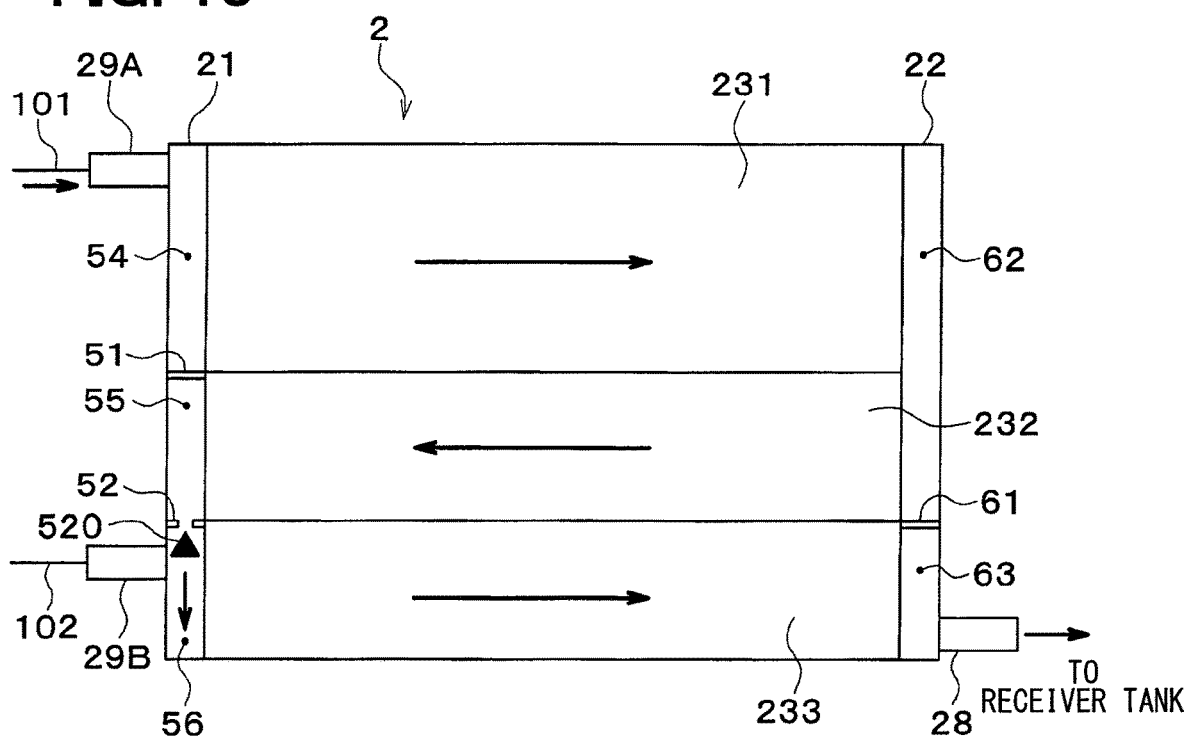
FIG. 18 is an explanatory diagram illustrating a flow of a refrigerant in a condenser during normal operation, according to Modification (1).
Figure 19:
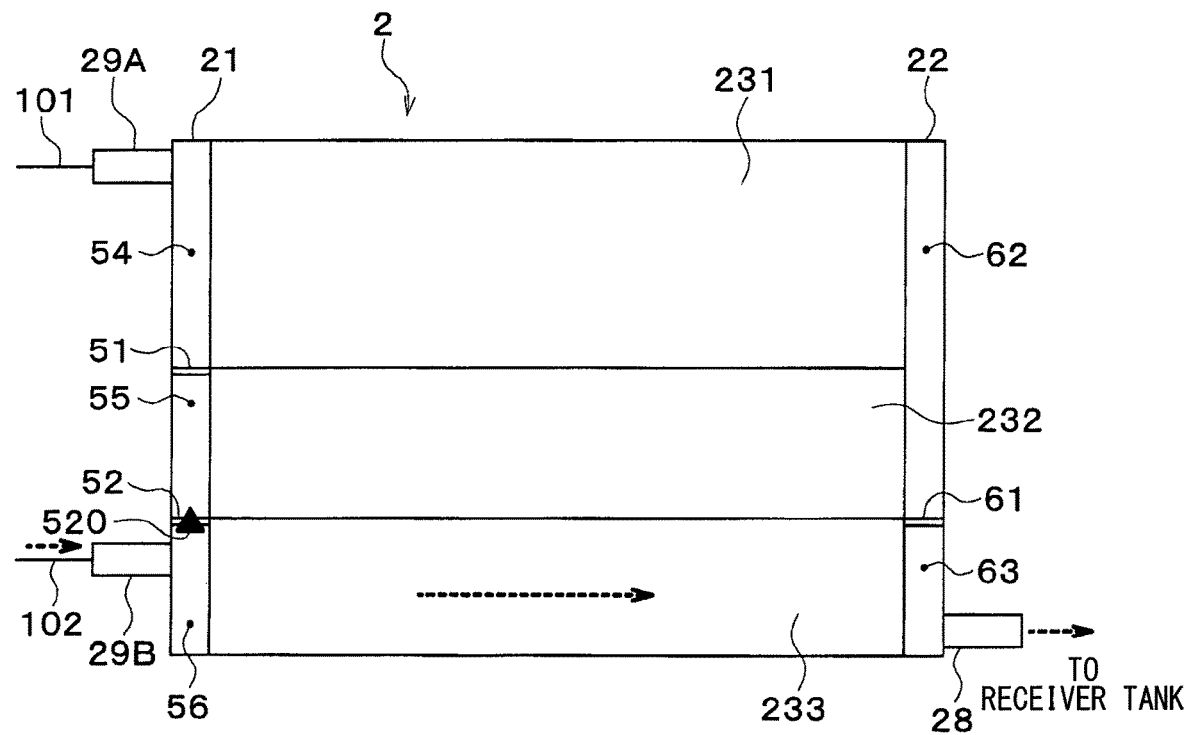
FIG. 19 is an explanatory diagram illustrating a flow of the refrigerant in the condenser when a high side pressure is reduced, according to Modification (1).

In this case, when any of the switching units 7A to 7D adopted switches the passage to the first inflow passage 101, the refrigerant discharged from the compressor 1 flows into the first space 54 of the first header tank 21 in the condenser 2 via the first inflow passage 101 and the first inlet pipe joint 29A as indicated by a solid arrow in FIG. 18. The refrigerant flowing into the first space 54 of the first header tank 21 flows through the first passage group 231, the first space 62 of the second header tank 22, and the second passage group 232 to flow into the second space 55 of the first header tank 21.

After flowing into the second space 55 of the first header tank 21, the refrigerant flows into the third space 56 of the first header tank 21 via the check valve 520. After flowing into the third space 56 of the first header tank 21, the refrigerant flows through the third passage group 233, flows into the second space 63 of the second header tank 22, and flows out to the refrigerant inlet side of the receiver tank 91 via the outlet pipe joint 28.

When any of the switching units 7A to 7D adopted switches the passage to the first inflow passage 101, as described above, the refrigerant flows through the condenser 2 while turning twice in the S shape to flow throughout the core 23.

On the other hand, when any of the switching units 7A to 7D adopted switches the passage to the second inflow passage 102, the refrigerant discharged from the compressor 1 flows into the third space 56 of the first header tank 21 in the condenser 2 via the second inflow passage 102 and the second inlet pipe joint 29B as indicated by a dotted arrow in FIG. 19. After flowing into the third space 56 of the first header tank 21, the refrigerant flows through the third passage group 233, flows into the second space 63 of the second header tank 22, and flows out to the refrigerant inlet side of the receiver tank 91 via the outlet pipe joint 28.

When any of the switching units 7A to 7D adopted switches the passage to the second inflow passage 102, as described above, the refrigerant flows through only the third passage group 233 of the condenser 2 which is a part of the core 23.

Modification (2)

In the condenser 2 of Modification (1), the second separator 52 of the first header tank 21 and the separator 61 of the second header tank 22 may be removed to remove the third passage group 233 of the core 23. At this time, in the first header tank 21, the check valve 520 may be provided in the first separator 51 and at the same time, the second inlet pipe joint 29B may be disposed such that the refrigerant flows into the second space 55 from the second inlet pipe joint 29B.

Figure 20:
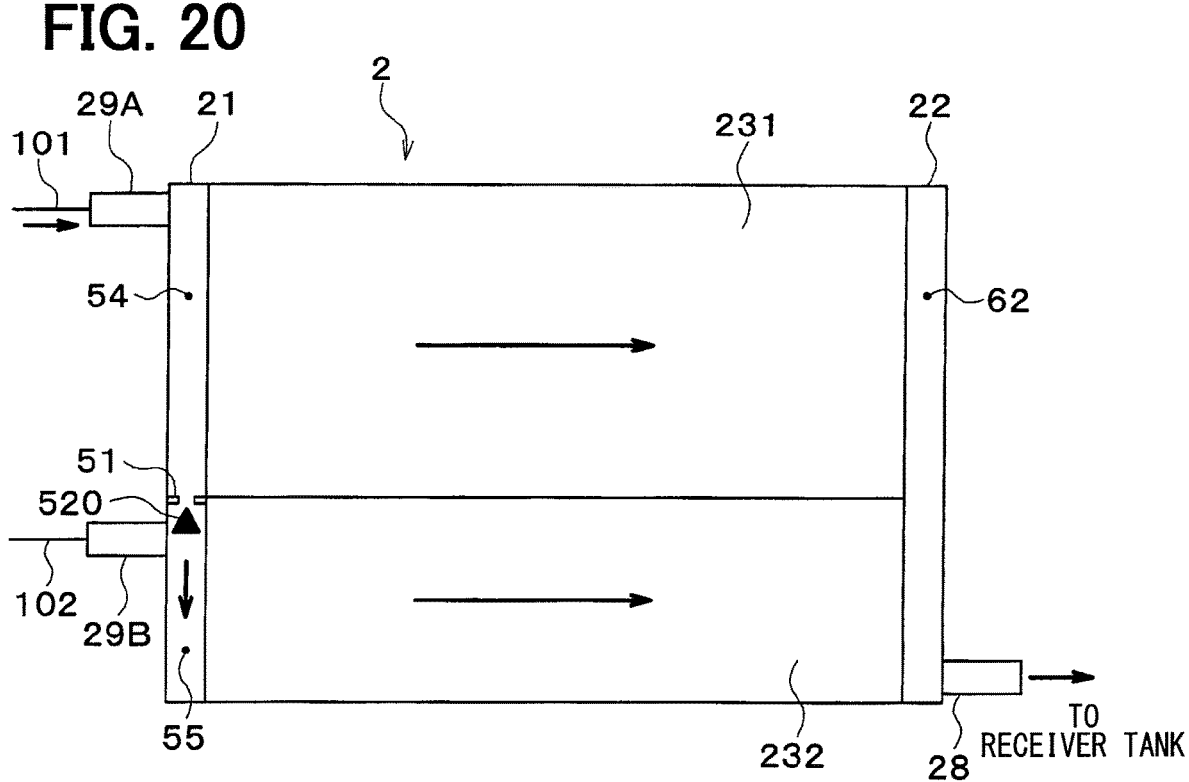
FIG. 20 is an explanatory diagram illustrating a flow of a refrigerant in a condenser during normal operation, according to Modification (2).

In this case, when any of the switching units 7A to 7D adopted switches the passage to the first inflow passage 101, the refrigerant discharged from the compressor 1 flows into the first space 54 of the first header tank 21 in the condenser 2 via the first inflow passage 101 and the first inlet pipe joint 29A as indicated by a solid arrow in FIG. 20. After flowing into the first space 54 of the first header tank 21, the refrigerant flows through the first passage group 231 to flow into the first space 62 of the second header tank 22.

After flowing into the first space 54 of the first header tank 21, the refrigerant also flows into the second space 55 of the first header tank 21 via the check valve 520. After flowing into the second space 55 of the first header tank 21, the refrigerant flows through the second passage group 232 to flow into the first space 62 of the second header tank 22. After flowing into the first space 62 of the second header tank 22, the refrigerant flows out to the refrigerant inlet side of the receiver tank 91 via the outlet pipe joint 28.

When any of the switching units 7A to 7D adopted switches the passage to the first inflow passage 101, as described above, the refrigerant flows through the core 23 linearly (in the I shape) to flow throughout the core 23 of the condenser 2.

Figure 21:
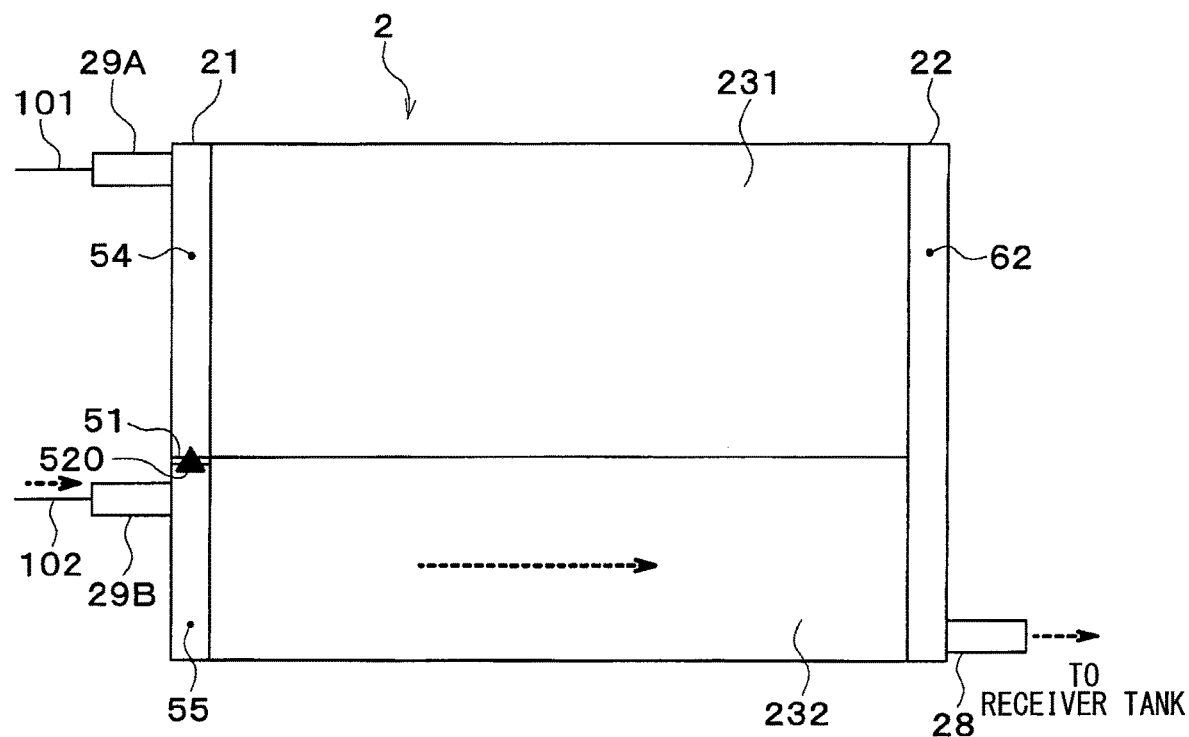
FIG. 21 is an explanatory diagram illustrating a flow of the refrigerant in the condenser when a high side pressure is reduced, according to Modification (2).

On the other hand, when any of the switching units 7A to 7D adopted switches the passage to the second inflow passage 102, the refrigerant discharged from the compressor 1 flows into the second space 55 of the first header tank 21 in the condenser 2 via the second inflow passage 102 and the second inlet pipe joint 29B as indicated by a dotted arrow in FIG. 21. After flowing into the second space 55 of the first header tank 21, the refrigerant flows through the second passage group 232, flows into the first space 62 of the second header tank 22, and flows out to the refrigerant inlet side of the receiver tank 91 via the outlet pipe joint 28.

When any of the switching units 7A to 7D adopted switches the passage to the second inflow passage 102, as described above, the refrigerant flows through only the second passage group 232 of the condenser 2 which is a part of the core 23.

Modification (3)

In the condenser 2 of Modification (1), the second separator 52 of the first header tank 21 may be removed and at the same time, the first separator 51 of the first header tank 21 and the separator 61 of the second header tank 22 may be disposed at the same height to remove the third passage group 233 of the core 23.

At this time, the check valve 520 may be provided in the separator 61 of the second header tank 22. The second inlet pipe joint 29B may be disposed such that the refrigerant flows into the second space 63 of the second header tank 22 from the second inlet pipe joint 29B. Moreover, the outlet pipe joint 28 may be disposed such that the refrigerant flows out from the second space 55 of the first header tank 21 via the outlet pipe joint 28.

Figure 22:
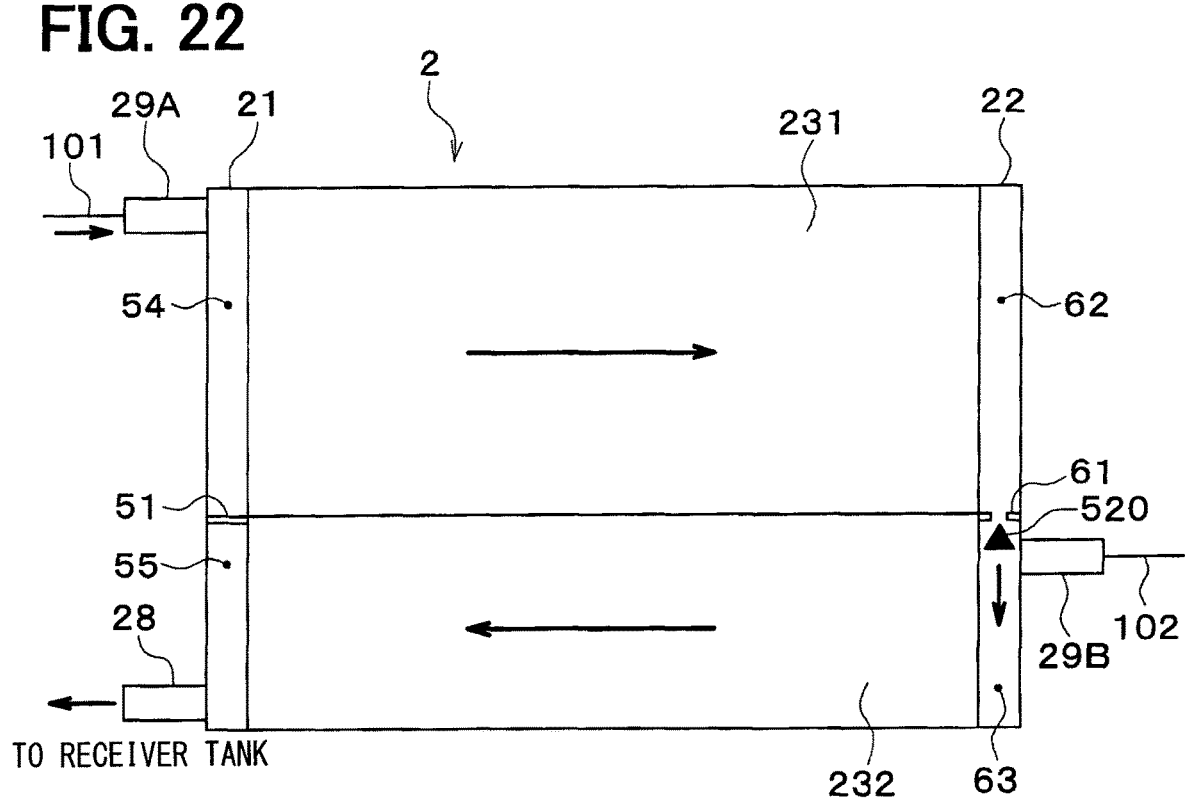
FIG. 22 is an explanatory diagram illustrating a flow of a refrigerant in a condenser during normal operation, according to Modification (3).

In this case, when any of the switching units 7A to 7D adopted switches the passage to the first inflow passage 101, the refrigerant discharged from the compressor 1 flows into the first space 54 of the first header tank 21 in the condenser 2 via the first inflow passage 101 and the first inlet pipe joint 29A as indicated by a solid arrow in FIG. 22. After flowing into the first space 54 of the first header tank 21, the refrigerant flows through the first passage group 231 to flow into the first space 62 of the second header tank 22.

After flowing into the first space 62 of the second header tank 22, the refrigerant flows into the second space 63 of the second header tank 22 via the check valve 520. After flowing into the second space 63 of the second header tank 22, the refrigerant flows through the second passage group 232, flows into the second space 55 of the first header tank 21, and flows out to the refrigerant inlet side of the receiver tank 91 via the outlet pipe joint 28.

When any of the switching units 7A to 7D adopted switches the passage to the first inflow passage 101, as described above, the refrigerant flows through the condenser 2 while turning once in the U shape to flow throughout the core 23.

Figure 23:
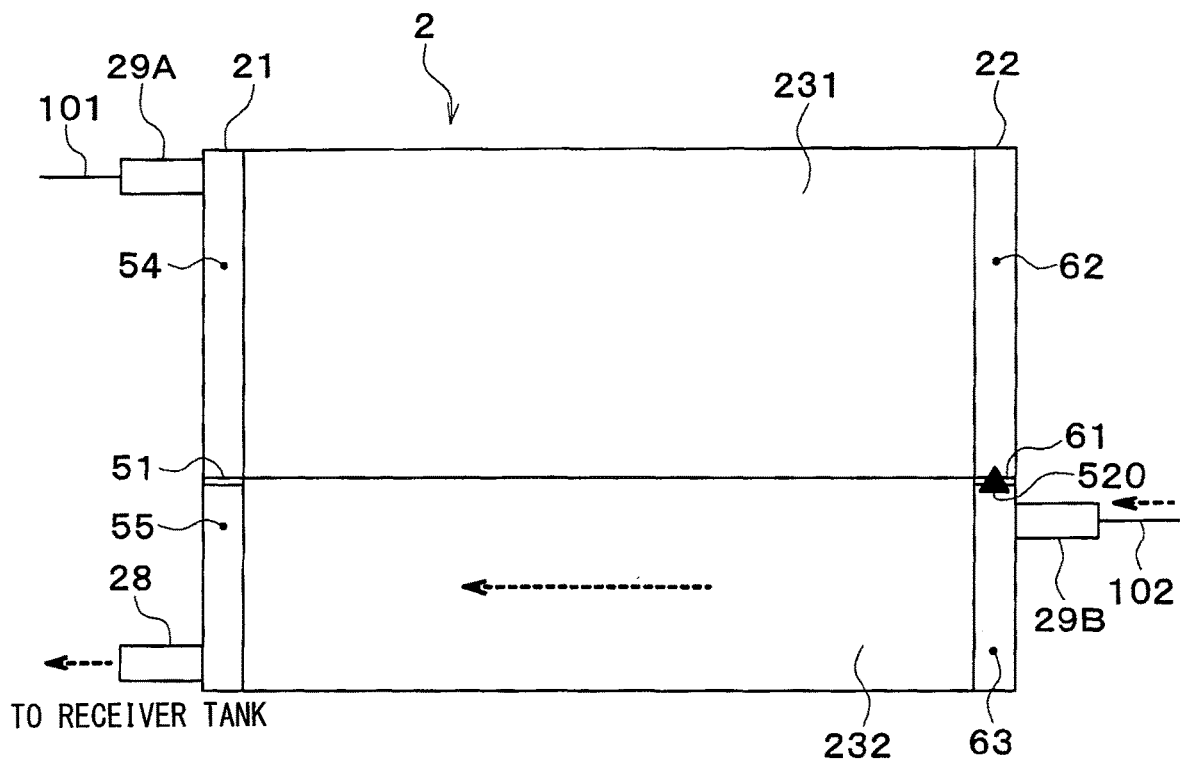
FIG. 23 is an explanatory diagram illustrating a flow of the refrigerant in the condenser when a high side pressure is reduced, according to Modification (3).

On the other hand, when any of the switching units 7A to 7D adopted switches the passage to the second inflow passage 102, the refrigerant discharged from the compressor 1 flows into the second space 63 of the second header tank 22 in the condenser 2 via the second inflow passage 102 and the second inlet pipe joint 29B as indicated by a dotted arrow in FIG. 23. After flowing into the second space 63 of the second header tank 22, the refrigerant flows through the second passage group 232, flows into the second space 55 of the first header tank 21, and flows out to the refrigerant inlet side of the receiver tank 91 via the outlet pipe joint 28.

When any of the switching units 7A to 7D adopted switches the passage to the second inflow passage 102, as described above, the refrigerant flows through only the second passage group 232 of the condenser 2 which is a part of the core 23.

Modification (4)

The above embodiment describes the example in which the three-way valve 7B and the two on/off valves 7C and 7D, which are electric switching valves, switch the refrigerant passage in the condenser 2 on the basis of all of the inlet mode, the vehicle speed V, the outside air temperature Ta, the high side pressure Ph of the refrigeration cycle 100, and the condenser inlet refrigerant temperature Td. However, the three-way valve 7B and the two on/off valves 7C and 7D may switch the refrigerant passage in the condenser 2 on the basis of at least one of the inlet mode, the vehicle speed V, the outside air temperature Ta, the high side pressure Ph of the refrigeration cycle 100, and the condenser inlet refrigerant temperature Td.

What is claimed is:

1. An air conditioner for a vehicle comprising:
a condenser that includes a core for allowing heat exchange between a refrigerant discharged from a compressor of a refrigeration cycle and air; and
a switching unit that switches a refrigerant passage in the condenser, wherein
the switching unit switches the refrigerant passage between a first refrigerant passage that allows the refrigerant to flow throughout the core, and a second refrigerant passage that allows the refrigerant to flow through a part of the core by allowing the refrigerant discharged from the compressor to flow into a middle part of the core.

2. The air conditioner according to claim 1, wherein the condenser includes:
a circulating unit through which the refrigerant flows when the switching unit switches the refrigerant passage to the second refrigerant passage;
a non-circulating unit through which the refrigerant does not flow when the switching unit switches the refrigerant passage to the second refrigerant passage; and
a check valve that inhibits the refrigerant from flowing from the circulating unit to the non-circulating unit when the switching unit switches the refrigerant passage to the second refrigerant passage.

3. The air conditioner according to claim 1, wherein the switching unit includes a differential pressure valve that includes:
a valve body that opens and closes an inlet of the second refrigerant passage; and an elastic member that applies a bias load to the valve body to open the inlet of the second refrigerant passage, and
the differential pressure valve switches the refrigerant passage in the condenser to the second refrigerant passage when a pressure difference between an atmospheric pressure and a high side pressure of the refrigeration cycle is smaller than or equal to a predetermined reference pressure difference.

4. The air conditioner according to claim 3, wherein the differential pressure valve is formed integrally with the condenser.

5. The air conditioner according to claim 1, wherein the switching unit includes a mechanical thermostat that switches the refrigerant passage in the condenser to the second refrigerant passage when a temperature of the refrigerant on an inlet side of the condenser is lower than or equal to a predetermined reference refrigerant temperature.

6. The air conditioner according to claim 1, wherein the switching unit includes an electric switching valve that switches the refrigerant passage in the condenser by an electric mechanism, and
the electric switching valve switches the refrigerant passage in the condenser on the basis of at least one of a vehicle speed, an outside air temperature, a high side pressure of the refrigeration cycle, and a temperature of the refrigerant on an inlet side of the condenser.

7. The air conditioner according to claim 1, further comprising:
an evaporator that allows the refrigerant discharged from the compressor to circulate and exchange heat with air blown into a passenger compartment, and cools the air; and
an inside/outside air switching unit that is switched between an inside air mode in which inside air is introduced into the evaporator with no outside air introduced into the evaporator, and a non-inside air mode in which at least the outside air is introduced into the evaporator, wherein
the switching unit includes an electric switching valve that switches the refrigerant passage by an electric mechanism, and
the electric switching valve switches the refrigerant passage in the condenser to the second refrigerant passage when the inside/outside air switching unit is switched to the inside air mode.

8. The air conditioner according to claim 1, further comprising:
an evaporator that allows the refrigerant discharged from the compressor to circulate and exchange heat with air blown into a passenger compartment, and cools the air; and
an internal heat exchanger that allows heat exchange between the refrigerant flowing out of the condenser and the refrigerant flowing out of the evaporator.

* * * * *